(12) United States Patent
Kakuwa et al.

(10) Patent No.: US 11,127,963 B2
(45) Date of Patent: Sep. 21, 2021

(54) SOLID OXIDE FUEL CELL SYSTEM

(71) Applicant: Panasonic Intellectual Property Management Co., Ltd., Osaka (JP)

(72) Inventors: Takashi Kakuwa, Osaka (JP); Shigenori Onuma, Kyoto (JP); Yuichi Mikami, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/280,041

(22) Filed: Feb. 20, 2019

(65) Prior Publication Data

US 2019/0288316 A1    Sep. 19, 2019

(30) Foreign Application Priority Data

Mar. 15, 2018    (JP) .............................. JP2018-048140

(51) Int. Cl.
| | |
|---|---|
| *H01M 8/04955* | (2016.01) |
| *H01M 8/04303* | (2016.01) |
| *H01M 8/0432* | (2016.01) |
| *H01M 8/04701* | (2016.01) |
| *H01M 8/04746* | (2016.01) |
| *H01M 8/0612* | (2016.01) |
| *H01M 8/1233* | (2016.01) |
| *H01M 8/124* | (2016.01) |

(52) U.S. Cl.
CPC ... *H01M 8/04955* (2013.01); *H01M 8/04303* (2016.02); *H01M 8/04365* (2013.01); *H01M 8/04373* (2013.01); *H01M 8/04731* (2013.01); *H01M 8/04753* (2013.01); *H01M 8/0618* (2013.01); *H01M 8/1233* (2013.01); *H01M 8/0612* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 2014/0308596 A1 | 10/2014 | Ibuka et al. | |
| 2018/0358640 A1* | 12/2018 | Shiomi | ............. H01M 8/04303 |
| 2018/0375129 A1* | 12/2018 | Yaguchi | ............. H01M 8/04432 |

FOREIGN PATENT DOCUMENTS

| | | |
|---|---|---|
| JP | 2005-340075 | 12/2005 |
| JP | 2006-294508 | 10/2006 |
| WO | 2013/069632 | 5/2013 |

* cited by examiner

*Primary Examiner* — Carmen V Lyles-Irving
(74) *Attorney, Agent, or Firm* — McDermott Will and Emery LLP

(57) ABSTRACT

A SOFC system includes: a fuel cell stack; a reformer; an air supplier: a combustor; and a controller. In a stop control of the above system, the controller calculates an average of ratios of the air to the raw material supplied to the reformer as a first average, in a case in which a molar fraction of a hydrogen component in the anode off-gas is higher than a molar fraction of a raw material component in the anode off-gas, and calculates the average of the ratios of the air to the raw material supplied to the reformer as a second average, in a case in which the molar fraction of the hydrogen component in the anode off-gas is lower than the molar fraction of the raw material component in the anode off-gas. The controller controls the air supplier so that the first average is higher than the second average.

7 Claims, 10 Drawing Sheets

SOLID OXIDE FUEL CELL SYSTEM

BACKGROUND

1. Technical Field

The present disclosure relates to a solid oxide fuel cell system.

2. Description of the Related Art

In a stop control (hereinafter, referred to as "stop control of SOFC system) of a solid oxide fuel cell system in which a fuel gas and air are continuously supplied to a fuel cell stack after power generation is stopped, various studies to suppress degradation of the fuel cell stack have been performed.

For example, International Publication No. 2013/069632 has proposed that in a stop control of a SOFC system, a fuel gas and air are each supplied at a flow rate having a desired constant ratio to the flow rate thereof in rated power generation of a fuel cell stack so as to suppress oxidation degradation of nickel of the fuel cell stack.

Japanese Patent No. 4906242 has proposed that in a stop control of a SOFC system, when air is supplied to a cathode of a fuel cell stack, and at the same time, when a mixed gas of a raw material gas and steam is supplied to an anode through a reformer, at a timing at which the temperature of the reformer is decreased to a range of "oxidation generation temperature±150° C." of a reforming catalyst, the supply of the mixed gas is stopped. In addition, a proposal has also been made that after the supply of the mixed gas is stopped, air or a hydrocarbon gas is allowed to flow to the fuel cell stack through the reformer as a purge gas. As a result, it has been disclosed that without causing oxidation degradation of the reforming catalyst, the stop control of the SOFC system can be appropriately performed.

Japanese Patent No. 4961682 has proposed that in a stop control of a SOFC system, air is supplied to a cathode of a fuel cell stack, and water (steam) and a raw material gas are continuously supplied to an anode through a reformer while the flow rates thereof are decreased. It has been disclosed that as a result, while the anode is maintained in a reducing atmosphere, the temperature of the fuel cell stack can be appropriately decreased.

SUMMARY

However, according to the related examples, in the stop control of the SOFC system in which the fuel gas and air are continuously supplied to the fuel cell stack after power generation is stopped, a method how to set an air flow rate in consideration of combustion characteristics of a combustor has not been studied.

One non-limiting and exemplary embodiment provides a SOFC system in which in a stop control of a SOFC system in which a fuel gas and air are continuously supplied to a fuel cell stack after power generation is stopped, an air flow rate is appropriately set in consideration of combustion characteristics of a combustor, so that degradation in durability of the fuel cell stack can be suppressed as compared to that in the past. In addition, a SOFC system capable of decreasing a stop time in the above stop control as compared to that in the past is also provided.

In one general aspect, the techniques disclosed here feature a SOFC system comprising: a fuel cell stack generating a power using a fuel gas and air; a reformer generating the fuel gas by reforming a raw material; an air supplier supplying the air to the fuel cell stack: a combustor combusting an anode off-gas and a cathode off-gas each discharged from the fuel cell stack; and a controller. In a stop control of the SOFC system in which the fuel gas and the air are continuously supplied to the fuel cell stack after power generation is stopped, the controller calculates an average value of ratios of the air to the raw material supplied to the reformer as a first average value, in a case in which a molar fraction of a hydrogen component in the anode off-gas is higher than a molar fraction of a raw material component in the anode off-gas, and the controller calculates the average value of the ratios of the air to the raw material supplied to the reformer as a second average value, in a case in which the molar fraction of the hydrogen component in the anode off-gas is lower than the molar fraction of the raw material component in the anode off-gas, and the controller controls the air supplier so that the first average value is higher than the second average value.

According to the SOFC system of the aspect of the present disclosure, in the stop control of the SOFC system in which the fuel gas and air are continuously supplied to the fuel cell stack after power generation is stopped, since the air flow rate is appropriately set in consideration of combustion characteristics of the combustor, an effect of suppressing degradation in durability of the fuel cell stack can be obtained unlike the case in the past. In addition, the SOFC system of the aspect of the present disclosure obtains an effect of decreasing a stop time in the above stop control as compared to that in the past.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
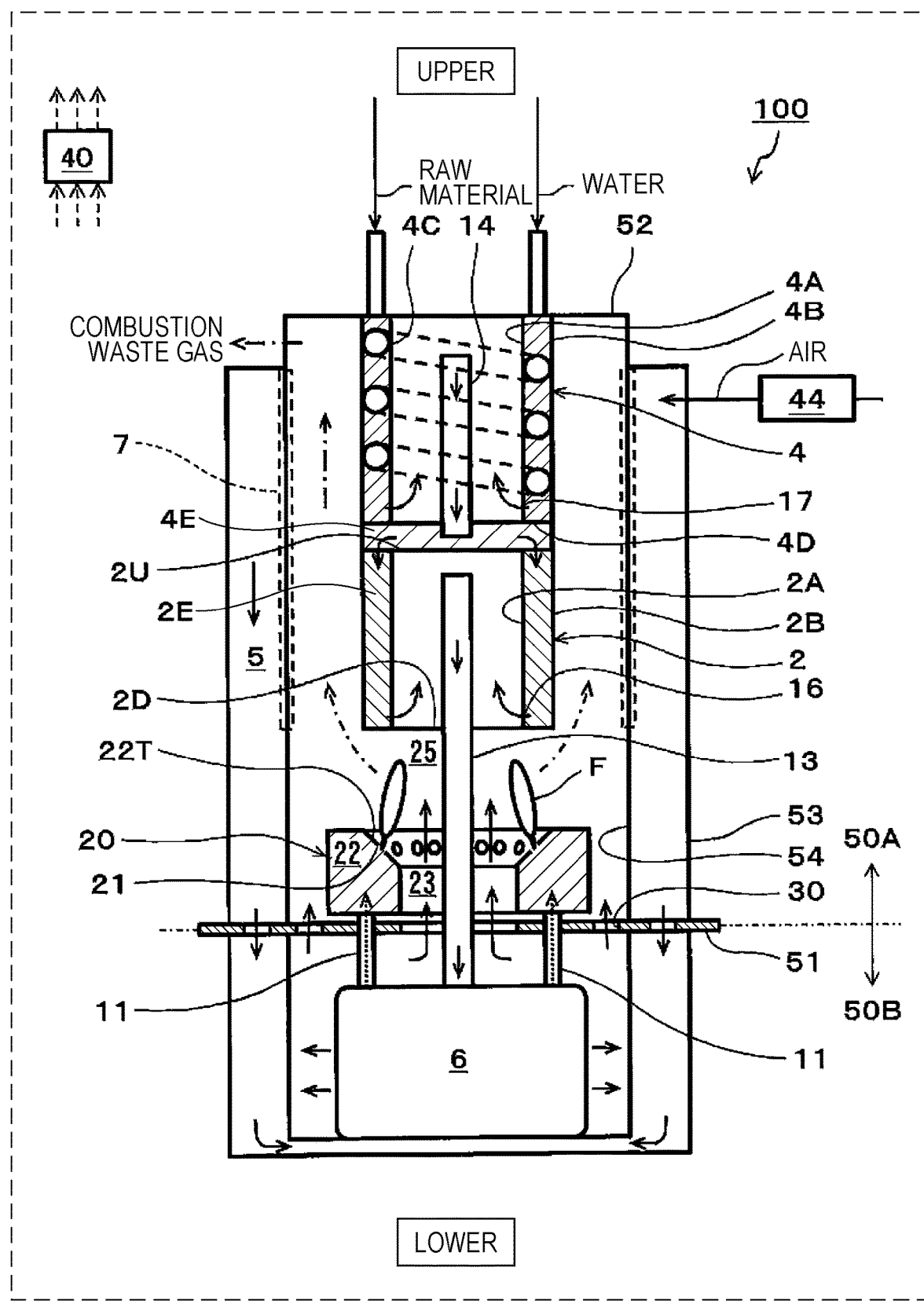
FIG. 1 is a schematic view showing one example of a SOFC system of a first embodiment.

In a stop control of a SOFC system in which a fuel gas and air are continuously supplied to a fuel cell stack after power generation is stopped, a method how to set an air flow rate in consideration of combustion characteristics of a combustor has been intensively studied, and as a result, the following was found.

When an instruction is made to stop power generation in a SOFC system in a power generation control operation of a fuel cell stack, the operation is shifted to a stop control of the SOFC system. In this case, since the fuel cell stack performs power generation in a high temperature atmosphere (for example, at approximately 600° C.), in order to appropriately stop the SOFC system, the temperature in the system is required to be stably and rapidly decreased from a high temperature to ordinary temperature.

In particular, it has been known that when nickel which has been frequently used as an anode (fuel electrode) of the fuel cell stack of the SOFC system is oxidized by being brought into contact with air in a high temperature atmosphere, the durability of the fuel cell stack is degraded. Hence, measures are required to prevent air from being brought into contact with the anode of the fuel cell stack until the temperature thereof is decreased to an appropriate temperature (for example, to approximately 400° C.) at which nickel is not oxidized, and heretofore, the following two methods have been primarily performed.

A first method is a method in which after power generation is stopped, air for cooling is continuously supplied only to a cathode (air electrode) of a fuel cell stack, and supply of a fuel gas to an anode of the fuel cell stack is stopped. Accordingly, since a fuel gas containing hydrogen is filled in the anode of the fuel cell stack, oxidation of nickel of the anode can be suppressed. Although this method has an advantage since a simple stop control is performed, pressure difference is generated between the inside and the outside of the anode in association with a temperature decrease of the anode of the fuel cell stack, and hence, air may flow into the anode in some cases. Accordingly, by the first method as described above, it is believed that oxidation of nickel of the anode is difficult to be sufficiently prevented.

A second method is a method in which even after power generation is stopped, air is continuously supplied to a cathode of a fuel cell stack, and at the same time, a fuel gas containing hydrogen is supplied to an anode until the temperature is decreased to an appropriate temperature (for example, to approximately 400° C.) at which nickel of the anode of the fuel cell stack is not oxidized. Accordingly, until the temperature of the fuel cell stack is decreased to the above appropriate temperature, since the fuel gas containing hydrogen flows to the anode of the fuel cell stack, oxidation of nickel of the anode can be suppressed. Although an oxidation suppression effect of nickel of the anode of this method is superior to that of the first method, an anode off-gas containing a combustible component is discharged outside. Hence, in many cases, the anode off-gas discharged from the anode is processed, for example, by a combustion treatment using a combustor after being mixed with a cathode off-gas (air) discharged from the cathode.

According to the second method, in the stop control of the SOFC system, when the flow rate of air supplied to the cathode of the fuel cell stack is increased, although the temperature of the SOFC system can be rapidly decreased, by an increase in flow rate of the cathode off-gas flowing in the combustor, lean combustion occurs therein, and as a result, flame of the combustor is liable to go out. If the flame of the combustor goes out, the fuel gas cannot be supplied to the anode of the fuel cell stack, and air may probably flow to the anode in some cases; hence, by oxidation of nickel of the anode, the durability of the fuel cell stack may be degraded in some cases.

On the other hand, when the flow rate of air supplied to the cathode of the fuel cell stack is decreased, although combustion stability of the combustor is improved, a stop time in the stop control of the SOFC system is increased.

That is, according to the second method, it is believed that the suppression of degradation in durability of the fuel cell stack and the decrease in stop time are in a trade-off relationship.

Incidentally, even in the stop control of the SOFC system, when the reformer is in a high temperature atmosphere, a fuel gas containing hydrogen is generated by reforming a raw material. In addition, the fuel gas containing hydrogen is supplied to the anode of the fuel cell stack through this reformer.

Accordingly, the present inventors focused on a phenomenon in that since the conversion rate or the like of the reformer is changed as the temperature of the reformer is decreased, the composition of the anode off-gas flowing from the anode of the fuel cell stack into the combustor is changed from a hydrogen component-dominant composition to a raw material component-dominant composition, and the following aspect of the present disclosure was finally made. That is, the present inventors found that in accordance with the change in composition of the anode off-gas flowing from the anode of the fuel cell stack to the combustor, when the flow rate of air supplied to the cathode of the fuel cell stack is appropriately set, the problem of the second method described above can be overcome.

That is, a SOFC system of a first aspect of the present disclosure comprises: a fuel cell stack generating a power using a fuel gas and air; a reformer generating the fuel gas by reforming a raw material; an air supplier supplying the air to the fuel cell stack: a combustor combusting an anode off-gas and a cathode off-gas each discharged from the fuel cell stack; and a controller. In a stop control of the SOFC system in which the fuel gas and the air are continuously supplied to the fuel cell stack after power generation is stopped, the controller calculates an average value of ratios of the air to the raw material supplied to the reformer as a first average value, in a case in which a molar fraction of a hydrogen component in the anode off-gas is higher than a molar fraction of a raw material component in the anode off-gas, and the controller calculates the average value of the ratios of the air to the raw material supplied to the reformer as a second average value, in a case in which the molar fraction of the hydrogen component in the anode off-gas is lower than the molar fraction of the raw material component in the anode off-gas, and the controller controls the air supplier so that the first average value is higher than the second average value.

In addition, in this specification, the "air ratio with respect to the raw material supplied to the reformer" (hereinafter, simply referred to as "air ratio" in some cases) indicates the ratio of an air flow rate supplied to the cathode of the fuel cell stack in the case in which the amount of air minimum required for complete combustion of the raw material is regarded as "1".

For example, an "air ratio with respect to methane supplied to the reformer" in the case in which the raw material is a methane gas which is a primary component of a city gas will be described below.

A combustion reaction of a methane gas is represented by the following formula (1).

$$CH_4 + 2O_2 \rightarrow CO_2 + 2H_2O \quad (1)$$

Hence, an air flow rate Q minimum required for complete combustion of a flow rate L of a methane gas supplied to the reformer is represented by the following formula (2) when 21% of oxygen is assumed to be contained in the air. Accordingly, since the "air ratio with respect to methane supplied to the reformer" is a ratio of an air flow rate supplied to the cathode of the fuel cell stack in the case in which this air flow rate Q is regarded as "1", the air ratio can be represented by the following formula (3).

$$Q = 2 \times L / 0.21 \quad (2)$$

$$\text{Air Ratio} = (\text{Air Flow Rate Supplied to Cathode of Fuel Cell Stack}) / Q \quad (3)$$

By the structure as described above, according to the SOFC system of this aspect, in the stop control of the SOFC system in which after power generation is stopped, the fuel gas and air are continuously supplied to the fuel cell stack, the air flow rate is appropriately set in consideration of combustion characteristics of the combustor, and hence, the degradation in durability of the fuel cell stack can be suppressed as compared to that in the past. In addition, the SOFC system of this aspect can decrease the stop time in this stop control as compared to that in the past.

Hereinafter, with reference to the case in which as the raw material supplied to the reformer, for example, a methane gas is used, an operational advantage of the first aspect will be described.

When the molar fraction of the hydrogen component in the anode off-gas is higher than the molar fraction of the methane component in the anode off-gas, since the composition of the anode off-gas flowing in the combustor is a hydrogen component-dominant composition, even if lean combustion occurs in the combustor, flame is not likely to go out. That is, even when the fuel of the combustor is lean, a flame by hydrogen combustion having a rapid combustion rate is not likely to go out as compared to a flame by a methane combustion having a slow combustion rate. Hence, at this stage, by an increase in flow rate of air supplied to the cathode of the fuel cell stack (that is, by an increase in the first average value of the air ratio), since the temperature of the SOFC system can be rapidly decreased, the stop time in the stop control of the SOFC system can be decreased as compared to that in the past.

On the other hand, when the molar fraction of the hydrogen component in the anode off-gas is lower than the molar fraction of the methane component in the anode off-gas, since the composition of the anode off-gas flowing in the combustor is a methane component-dominant composition, when lean combustion occurs in the combustor, flame is liable to go out. That is, when the fuel in the combustor is lean, a flame by methane combustion having a slow combustion rate is liable to go out as compared to a flame by hydrogen combustion having a rapid combustion rate. Hence, at this stage, by a decrease in flow rate of air supplied to the cathode of the fuel cell stack (that is, by a decrease in the second average value of the air ratio), the combustion stability of the combustor can be improved. Accordingly, the probability in that since the flame of the combustor goes out, the fuel gas cannot be supplied to the anode of the fuel cell stack, and air flows to the anode can be reduced, and hence, the degradation in durability of the fuel cell stack can be suppressed as compared to that in the past.

A SOFC system of a second aspect of the present disclosure may include a temperature detector detecting the temperature of the reformer of the SOFC system of the first aspect, and in the stop control of the SOFC system, the controller may control the air supplier based on the temperature detected by this temperature detector.

Whether the composition of the anode off-gas flowing in the combustor from the anode of the fuel cell stack is a hydrogen component-dominant composition or a raw material component-dominant composition can be known by detecting the temperature of the reformer. Hence, the SOFC system of this aspect can appropriately set the flow rate of air supplied to the cathode of the fuel cell stack by controlling the air supplier based on the temperature detected by the temperature detector.

According to a SOFC system of a third aspect of the present disclosure, in the stop control of the SOFC system of the second aspect, the controller of the SOFC system may decrease the air ratio by controlling the air supplier in association with a decrease in temperature detected by the temperature detector.

The composition of the anode off-gas flowing in the combustor from the anode of the fuel cell stack is changed from a hydrogen component-dominant composition to a raw material component-dominant composition since the conversion rate or the like of the reformer is changed in association with the decrease in temperature of the reformer. Hence, in the SOFC system of this aspect, as the temperature detected by the above temperature detector is decreased, the flow rate of air supplied to the fuel cell stack is decreased by controlling the air supplier, so that the flow rate of air supplied to the cathode of the fuel cell stack can be appropriately set.

According to a SOFC system of a fourth aspect of the present disclosure, in the SOFC system of the second aspect or the third aspect, the temperature detector may be provided for the reformer.

According to a SOFC system of a fifth aspect, in the SOFC system of the second aspect or the third aspect, the temperature detector may be provided for the fuel cell stack or the periphery thereof.

A SOFC system of a sixth aspect of the present disclosure may include a raw material supplier supplying the raw material to the reformer of the SOFC system of any one of the first to the fifth aspects, and in the stop control of the SOFC system, the controller may control the raw material supplier so as to set a supply amount of the raw material supplied to the reformer to a flow rate corresponding to a calorific value of 300 W or more.

With reference to the case in which as the raw material supplied to the reformer, for example, a methane gas is used, hereinafter, an operational advantage of the sixth aspect will be described.

If the composition of the anode off-gas flowing in the combustor from the anode of the fuel cell stack is a methane component-dominant composition, when a methane gas flow rate is set to less than a calorific value of 300 W, due to an insufficient amount of heat of combustible gas combustion of the combustor, the combustible gas combustion may be probably not maintained in some cases. However, in the SOFC system of this aspect, by the structure as described above, the above probability can be reduced.

A SOFC system of a seventh aspect of the present disclosure may include a water supplier supplying water to the reformer of the SOFC system of any one of the first to the sixth aspects, and in the stop control of the SOFC system, the controller may control the water supplier so as to set S/C of the reformer to 2.0 or more. Incidentally, S/C indicates the ratio of the number of moles of steam used for a reforming reaction to the number of moles of carbon (C) forming a raw material hydrocarbon.

When S/C of the reformer is set to less than 2.0, although a reforming catalyst may be probably degraded in some cases by carbon precipitation on the reforming catalyst, in the SOFC system of this aspect, by the structure described above, the probability described above can be reduced.

A SOFC system of an eight aspect of the present disclosure may include an ignition device igniting the combustor of the SOFC system of any one of the second to the fifth aspects, and in the stop control of the SOFC system, the controller may control the ignition device to ignite the combustor when the temperature detected by the temperature detector is decreased by a predetermined value or more in a predetermined time or at predetermined time intervals.

When the decrease of the detected temperature within a certain time exceeds a predetermined amount, the flame of the combustor may go out. Hence, in this case, according to the SOFC system of this aspect, since the combustor is ignited, the state in which the flame of the combustor goes out is suppressed from being continued. That is, from the state in which the flame of the combustor goes out, a normal combustion state can be rapidly recovered.

In addition, in the SOFC system of this aspect, since the combustor is ignited at predetermined time intervals, the probability of forming the state in which the flame of the combustor goes out can be reduced.

According to a SOFC system of a ninth aspect of the present disclosure, in the SOFC system of any one of the first to the eighth aspects, the combustor may be a diffusion combustor.

By the structure described above, the probability of forming the state in which the flame of the combustor goes out can be reduced.

Hereinafter, with reference to the drawings, embodiments of the present disclosure will be described. In addition, the embodiments described below each show one example of the aspects described above. Hence, the following shapes, materials, values, constituent elements, arrangement positions and connection modes of the constituent elements, and the like are described by way of example and are not intended to limit the aspects described above unless otherwise described in claims. In addition, among the following constituent elements, a constituent element not described in an independent claim which shows the topmost concept of the above aspect may be described as an arbitrary constituent element. In addition, in the drawings, description of constituent elements designated by the same reference numeral may be omitted in some cases. In order to facilitate the understanding of the drawings, the constituent elements are each schematically drawn, and the shape, the dimensional rate, and the like may be not precisely illustrated in some cases.

In the operation, if needed, for example, the order of steps may be changed. In addition, if needed, another known step may also be added to the operation.

First Embodiment

[Device Structure]

FIG. 1 is a schematic view showing one example of a SOFC system of a first embodiment.

In addition, for convenience, "upper" and "lower" are drawn as shown in FIG. 1, and the gravity is assumed to act in a direction from an upper side to a lower side (the same is also shown in each of FIGS. 6, 8, 9, and 10).

In the example shown in FIG. 1, a SOFC system 100 includes a reformer 2, a fuel cell stack 6, a combustor 20, a controller 40, and an air supplier 44.

In addition, in the SOFC system 100 of this embodiment, there is provided a partition portion 51 separating the inside of the SOFC system 100 into an upper region 50A in which the reformer 2, an evaporator 4, the combustor 20, and the like are received and a lower region 50B in which the fuel cell stack 6 and the like are received.

The reformer 2 is a device generating a fuel gas (reformed gas) containing hydrogen by reforming a hydrocarbon-based raw material. In this structure, the reformer 2 is disposed at an upper side of the combustor 20 and includes a side wall portion formed from an inside wall 2A and an outside wall 2B; however, the structure of the reformer 2 is not limited to that described above.

However, in the case in which the reformer 2 includes the side wall portion, when the thickness of the side wall portion is appropriately set, heat from a combustion exhaust gas can be efficiently transferred to the entire of a reforming catalyst 2E filled in the side wall portion of the reformer 2.

For example, after a required amount (such as approximately 200 g) of the reforming catalyst 2E is secured in the reformer 2, the distance (that is, the thickness of the side wall portion) between the inside wall 2A and the outside wall 2B may be set to approximately 10 mm so that heat held by the combustion exhaust gas is sufficiently transferred to the entire reforming catalyst 2E.

In addition, in the SOFC system 100 of this embodiment, the inside wall 2A and the outside wall 2B of the reformer 2 are cylindrical bodies having different diameters but are not limited thereto. The inside wall 2A and the outside wall 2B each may also be a rectangular tube body.

However, as is the case of the SOFC system 100, when the inside wall 2A and the outside wall 2B of the reformer 2 are each formed of a cylindrical body, compared to the case in which those walls are each formed from a rectangular tube body, the welding length and the number of welding spots in the manufacturing can be decreased. Hence, the manufacturing cost of the reformer 2 can be reduced. In addition, when the inside wall 2A and the outside wall 2B of the reformer 2 are each formed from a cylindrical body, resistance against gas pressure and resistance against heat stress are improved, and hence, the thickness of the cylindrical body can be decreased.

In the SOFC system 100 of this embodiment, an upper end region of the side wall portion of the reformer 2 is covered with an upper plate member 2U, and a lower end region of the side wall portion is covered with a lower plate member 2D. In addition, in a peripheral portion of the upper plate member 2U, a plurality of opening portions (not shown) through which a gas to be supplied to the reforming catalyst 2E passes is formed.

As shown in FIG. 1, a high-temperature combustion exhaust gas passes through a space between the outside wall 2B of the reformer 2 and an inside wall 54 of a container of the SOFC system 100. Accordingly, the reforming catalyst 2E of the reformer 2 is heated by heat of the combustion exhaust gas.

In the vicinity of a lower end portion of the inside wall 2A of the reformer 2, a folding portion 16 is provided. The folding portion 16 has a plurality of opening portions (not shown) provided along the circumference of the inside wall 2A. These opening portions are each formed in the inside wall 2A to have a size (such as a round hole having a diameter of approximately 1 to 3 mm) which prevents catalyst particles of the reforming catalyst 2E from passing therethrough and which allows the fuel gas to pass therethrough.

In addition, a fuel gas supply path 13 penetrates the lower plate member 2D in an air-tight state and vertically extends upward in a space in the reformer 2. In addition, an upper end portion of the fuel gas supply path 13 is located at a position at which the flow of the fuel gas from the space in the reformer 2 to the fuel gas supply path 13 is not disturbed and at a position below the upper plate member 2U. A lower end portion of the fuel gas supply path 13 is connected to the fuel cell stack 6.

A reforming reaction of the reformer 2 may have any reaction mode. For example, in a power generation control operation of the SOFC system 100, as the reforming reaction of the reformer 2, a steam reforming reaction is taken place. In general, as a catalyst metal of the reforming catalyst 2E, at least one selected from the group consisting of noble metal catalysts, such as Pt, Ru, and Rh, and nickel (Ni) may be used.

In addition, as the raw material, there may be used a hydrocarbon-based raw material gas, such as a city gas, a natural gas, each of which contains a methane gas as a primary component, or LPG, containing an organic compound formed from at least carbon and hydrogen. In addition, a hydrocarbon-based liquid fuel, such as an alcohol, a biofuel, or light oil, may also be used.

In this case, water (steam) and the raw material are each required to be supplied in a high temperature state (for example, at approximately 400° C. to 700° C.) to the reformer 2.

Accordingly, in the SOFC system 100 of this embodiment, right above the upper plate member 2U of the reformer 2, the evaporator 4 is provided, and water (steam) and the raw material are each supplied to the reformer 2 through the evaporator 4. In addition, in the reformer 2, a fuel gas is generated which contains $H_2$, $CO_2$, and CO, each of which is generated in a layer of the reforming catalyst 2E filled in the reformer 2 by a steam reforming reaction, and which also contains an unreformed gas and steam. The fuel gas is supplied to an anode of the fuel cell stack 6 through the fuel gas supply path 13.

The evaporator 4 includes a side wall portion formed of an inside wall 4A and an outside wall 4B and a bottom portion 4E formed of the upper plate member 2U of the reformer 2 and a lower plate member 4D. An upper end region of the side wall portion of the evaporator 4 is covered with an upper wall 52 of the container of the SOFC system 100, and a lower end region of the side wall portion is covered with the lower plate member 4D. Hence, the inside of the side wall portion and the inside of the bottom portion 4E of the evaporator 4 are each a space. In addition, in the side wall portion, a flow path member 4C (such as a wire) forming a spiral flow path is wound.

In addition, the outside wall 4B of the evaporator 4 and the outside wall 2B of the reformer 2 are formed from the same cylindrical body. Accordingly, the number of components of the SOFC system 100 can be decreased.

In this case, the inside wall 4A and the outside wall 4B of the evaporator 4 may be cylindrical bodies having different diameters but are not limited thereto. Those inside walls 4A and outside walls 4B each may also be, for example, a rectangular tuber body.

However, as is the SOFC system 100, when the inside wall 4A and the outside wall 4B of the evaporator 4 are each formed of a cylindrical body, since the welding length and the number of welding spots in the manufacturing can be decreased as compared to the case in which the walls described above are each formed of a rectangular tube body, the manufacturing cost of the evaporator 4 can be reduced. In addition, when the inside wall 4A and the outside wall 4B of the evaporator 4 are each formed of a cylindrical body, resistance against gas pressure and resistance against heat stress are improved, and hence, the thickness of the cylindrical body can be decreased.

As shown in FIG. 1, a high-temperature combustion exhaust gas passes through a space between the outside wall 4B of the evaporator 4 and the inside wall 54 of the container of the SOFC system 100. Accordingly, the inside of the side wall portion of the evaporator 4 is heated by heat of the combustion exhaust gas.

In the vicinity of a lower end portion of the inside wall 4A of the evaporator 4, a folding portion 17 is provided. The folding portion 17 has a plurality of opening portions (not shown) provided along the circumference of the inside wall 4A. In addition, a mixed gas supply path 14 through which a mixed gas of the raw material and steam passes penetrates the lower plate member 4D in an air-tight state and vertically extends upward in a space in the evaporator 4. In addition, an upper end portion of the mixed gas supply path 14 is located at a position at which the flow of the mixed gas from the space in the evaporator 4 to the mixed gas supply path 14 is not disturbed and at a position below the upper wall 52. A lower end portion of the mixed gas supply path 14 is located at a position at which the flow of the mixed gas from a space in the bottom portion 4E of the evaporator 4 to the reforming catalyst 2E is not disturbed and at a position above the upper plate member 2U.

In addition, the evaporator 4 may have any structure as long as being disposed in contact with the reformer 2. For example, as is the SOFC system 100, the structure may also be used in which the evaporator 4 and reformer 2 are disposed in this order in a direction from an upper side to a lower side, and the side wall portion of the evaporator 4 and the side wall portion of the reformer 2 are in contact with each other with the bottom portion 4E of the evaporator 4 interposed therebetween.

The fuel cell stack 6 includes at least one solid oxide fuel cell (SOFC, not shown) generating a power using the fuel gas and air.

The air supplier 44 is a device supplying air to the fuel cell stack 6. The air supplier 44 may have any structure as long as capable of supplying air to the fuel cell stack 6. As the air supplier 44, for example, although a blower may be mentioned, the air supplier 44 is not limited thereto.

That is, air is supplied to a cathode of the fuel cell stack 6 through an air supply path 5 connected to the air supplier 44, and to the anode of the fuel cell stack 6, the fuel gas is supplied through the fuel gas supply path 13 connected to the reformer 2. In addition, the details of the air supply path 5 will be described later.

In the fuel cell stack 6, single cells (not shown) of the fuel cell stack 6 are assembled together and connected to each other in series. The fuel cell stack 6 may be formed by laminating flat plate single cells or by assembling cylindrical single cells.

The single cells of the fuel cell stack 6 each include a solid oxide fuel electrolyte, an anode, and a cathode.

As the solid oxide electrolyte, there may be used either an oxide ion conductive electrolyte or a proton conductive electrolyte.

The anode of the single cell is provided on one primary surface of the solid oxide electrolyte and the cathode of the single cell is provided on the other primary surface of the solid oxide electrolyte. Although the anode of the single cell is formed from a material having a composition containing at least nickel (Ni), the structure of the single cell as described above is similar to that of a general SOFC, and hence, detail description thereof will be omitted.

The air supply path 5 is a path through which air to be supplied to the cathode of the fuel cell stack 6 flows. In particular, after supplied to the air supply path 5 by the air supplier 44, air is supplied to the fuel cell stack 6.

The air supply path 5 is formed between the inside wall 54 and an outside wall 53 of the container of the SOFC system 100, and the inside wall 54 extends from the upper wall 52 of the container of the SOFC system 100 to a lower side of the fuel cell stack 6 and covers a bottom portion of the SOFC system 100. Since an operation temperature of the SOFC system 100 is high (such as 600° C. or more), the structure in which the periphery of the container of the SOFC system 100 is covered with an insulating material (not shown) so as to suppress heat dissipation to the outside has been frequently used.

An anode off-gas discharge path 11 is a path through which an anode off-gas discharged from the anode of the fuel cell stack 6 flows. In particular, after passing through the anode off-gas discharge path 11, an anode off-gas containing a hydrogen gas ($H_2$), steam ($H_2O$), carbon monoxide (CO), an unreformed raw material, and the like, each of which is not used for power generation of the fuel cell stack 6, is supplied to the combustor 20.

In this case, the anode off-gas discharge path 11 extends from the anode of the fuel cell stack 6 to the combustor 20 through the lower region 50B and the partition portion 51. In addition, the number of the anode off-gas discharge paths 11 is 2 but is not limited thereto.

A cathode off-gas discharge path is a path through which a cathode off-gas discharged from the cathode of the fuel cell stack 6 flows. In particular, after passing through this cathode off-gas discharge path, air (cathode off-gas) not used for power generation of the fuel cell stack 6 is supplied to a combustion space 25.

In this case, the cathode off-gas discharge path is formed by a space in the lower region 50B in which the fuel cell stack 6 is received, a first cathode off-gas passing region 23, and a second cathode off-gas passing region 30.

An air heat exchanger 7 is a device which exchanges heat of air flowing in the air supply path 5 and heat of a combustion exhaust gas flowing in a space surrounded by the inside wall 54. That is, in the air heat exchanger 7, a part of the inside wall 54 exposed to the combustion exhaust gas functions as a heat conduction surface. Accordingly, when air at ordinary temperature flows through the air supply path 5 from an upper side to a lower side, by heat exchange with the combustion exhaust gas flowing in the space surrounded by the inside wall 54 from a lower side to an upper side, the air is heated to a high temperature (for example, to approximately 600° C. to 700° C.). Furthermore, the air is heated to a temperature required for a power generation reaction of the fuel cell stack 6 using internal reforming reaction heat of the fuel cell stack 6 and is then supplied to the cathode of the fuel cell stack 6 from a lower portion of the container receiving the fuel cell stack 6. In addition, after cooled to an appropriate temperature (for example, to approximately 100° C. to 200° C.), the combustion exhaust gas is discharged outside the SOFC system 100. This combustion exhaust gas may be supplied, for example, to a heat exchanger (not shown) for generation of hot water for hot water supply.

The combustor 20 is a device combusting the anode off-gas and the cathode off-gas discharged from the fuel cell stack 6.

In particular, the cathode off-gas and the anode off-gas discharged from the fuel cell stack 6 are each sprayed out to the combustion space 25. As a result, those gases are diffusion-combusted in the combustion space 25.

The combustor 20 includes an anode off-gas collection portion 22. In the anode off-gas collection portion 22, there are provided a plurality of anode off-gas spray holes 21 which collect the anode off-gas discharged from the anode of the fuel cell stack 6 and which spray the anode off-gas thus collected to the combustion space 25. The anode off-gas collection portion 22 is formed so as to surround the first cathode off-gas passing region 23 through which the cathode off-gas discharged from the cathode of the fuel cell stack 6 passes.

As shown in FIG. 1, the anode off-gas collection portion 22 is formed from a hollow torus body. In addition, at least one opening portion is formed in the partition portion 51 so that the space surrounded by this torus body communicates with the lower region 50B.

The space surrounded by the torus body and including this opening portion is used as the first cathode off-gas passing region 23. In addition, an opening portion formed in the partition portion 51 at a position along the outer circumference of the anode off-gas collection portion 22 and at an inner side than the inside wall 54 is used as the second cathode off-gas passing region 30.

In the first cathode off-gas passing region 23, the cathode off-gas passes through the space surrounded by the anode off-gas collection portion 22, and a flame F is formed at the anode off-gas spray hole 21 in an inner direction so as to be close to the fuel gas supply path 13. Hence, the cathode off-gas may be difficult in some cases to spread over the outer circumference of the flame F.

Accordingly, when the cathode off-gas is partially allowed to pass through the second cathode off-gas passing region 30 located outside of the anode off-gas collection portion 22, a mixing property of the cathode off-gas and the anode off-gas can be improved even at the outer circumference of the flame F. In addition, by improving the mixing property of the cathode off-gas and the anode off-gas, the combustion characteristics of the combustor 20 can be further improved. For example, the structure may be formed so that an approximately half of the total amount of the cathode off-gas discharged from the cathode of the fuel cell stack 6 passes through the second cathode off-gas passing region 30.

In addition, the anode off-gas spray hole 21 is provided so that the anode off-gas sprayed upward from the anode off-gas spray hole 21 is close to the cathode off-gas passing through the first cathode off-gas passing region 23 from a lower side to an upper side. That is, the anode off-gas collection portion 22 includes a tapered surface 22T inclined downward to the first cathode off-gas passing region 23, and in the tapered surface 22T, the anode off-gas spray holes 21 are formed.

As described above, the anode off-gas sprayed from the anode off-gas spray hole 21 and the cathode off-gas passing through the first cathode off-gas passing region 23 are diffusion-combusted.

In addition, in the SOFC system 100 of this embodiment, the anode off-gas collection portion 22 is formed from a torus body but is not limited thereto. The anode off-gas collection portion 22 may be formed, for example, from a rectangular toroidal body.

However, as is the SOFC system 100 of this embodiment, when the anode off-gas collection portion 22 is formed from a torus body, compared to the case in which the anode off-gas collection portion 22 is formed, for example, from a rectangular toroidal body, since the welding length and the number of welding spots in the manufacturing can be decreased, the manufacturing cost of the anode off-gas collection portion 22 can be reduced. In addition, resistance against gas pressure and resistance against heat stress are improved, and hence, the thickness of the torus body can be decreased.

In the stop control of the SOFC system 100 in which the fuel gas and air are continuously supplied to the fuel cell stack 6 after the power generation is stopped, in the case in which a molar fraction ($\beta$) of a hydrogen component in the anode off-gas is higher than a molar fraction ($\alpha$) of a raw material component in the anode off-gas ($\beta>\alpha$), an average value of an air ratio with respect to the raw material supplied to the reformer 2 is regarded as a first average value; in the case in which the molar fraction ($\beta$) of the hydrogen component in the anode off-gas is lower than the molar fraction ($\alpha$) of the raw material component in the anode off-gas ($\beta<\alpha$), the average value of the air ratio with respect to the raw material supplied to the reformer 2 is regarded as a second average value; and the controller 40 controls the air supplier 44 so that the first average value is higher than the second average value.

The controller 40 may control the entire operation of the SOFC system 100.

The controller 40 may have any structure as long as having a control function. The controller 40 includes, for example, a computing circuit (not shown) and a storage circuit (not shown) storing a control program. As the computing circuit, for example, an MPU and/or a CPU may be mentioned. As the storage circuit, for example, a memory may be mentioned.

The controller 40 may be formed from a single controller performing a central control or may be formed from a plurality of controllers performing a distributed control in cooperation with each other.

In addition, although not shown in FIG. 1, in the operation of the SOFC system 100, necessary devices may be appropriately provided.

For example, when the reforming reaction of the reformer 2 is a steam reforming reaction, a water supplier (such as a pump) supplying water to the evaporator 4, a raw material supplier (such as a pump) supplying the raw material to the evaporator 4, and the like may be provided. When the reforming reaction is an autothermal reaction, in the SOFC system 100, for example, an air supplier (such as a blower) supplying reforming air to the reformer 2 and the like may be provided. In addition, for example, an ignition device (such as an ignition heater) igniting the combustor 20 may be provided at an appropriate position in the combustion space 25. In addition, a temperature detector detecting the temperatures of the reformer 2, the fuel cell stack 6, and the like may be provided at an appropriate position of the SOFC system 100.

[Stop Control of SOFC System]

Hereinafter, with reference to the drawings and tables, details of the stop control of the SOFC system 100 will be described.

As described above, in the stop control of the SOFC system 100, when the flow rate of air supplied to the cathode of the fuel cell stack 6 is increased, although the temperature of the SOFC system 100 can be rapidly decreased, by the increase in flow rate of the cathode off-gas flowing in the combustor 20, lean combustion occurs in the combustor 20, and as a result, the flame of the combustor 20 is liable to go out. If the flame of the combustor 20 goes out, the fuel gas cannot be supplied to the anode of the fuel cell stack 6, and as a result, air may flow to the anode in some cases.

For example, as apparent from the structure of the SOFC system 100 shown in FIG. 1, a downstream end of the anode off-gas discharge path 11 is opened to a space in the combustor 20. Hence, when the fuel gas cannot be supplied to the anode of the fuel cell stack 6, since the anode off-gas cannot be supplied to the anode off-gas discharge path 11, air present in the combustor 20 may flow to the anode in some cases through the anode off-gas discharge path 11. As a result, by oxidation of nickel of the anode, the durability of the fuel cell stack may be degraded in some cases.

On the other hand, when the flow rate of air supplied to the cathode of the fuel cell stack 6 is decreased, although the combustion stability of the combustor 20 can be improved, the stop time in the stop control of the SOFC system 100 is increased.

Accordingly, the present inventors focused on a phenomenon in that in the SOFC system 100 of this embodiment, for example, when a city gas containing a methane gas as a primary component is used as the raw material, since the conversion rate or the like of the reformer 2 is changed in association with the decrease in temperature of the reformer 2, the composition of the anode off-gas flowing in the combustor 20 from the anode of the fuel cell stack 6 is changed from a hydrogen component-dominant composition to a methane component-dominant composition. That is, the present inventors focused on the difference in combustion characteristics between hydrogen combustion having a rapid combustion rate and methane combustion having a slow combustion rate.

The following Table 1 shows one example of operation conditions of each device of the SOFC system 100 in the stop control of the SOFC system 100. In this case, for convenience, the sequence of the stop control of the SOFC system 100 is divided into Stage 1 to Stage 5 corresponding to the decrease in temperature of the fuel cell stack 6 and the reformer 2, and the operation conditions of each stage from Stage 1 to Stage 5 are shown. For example, as the temperatures of the fuel cell stack 6 and the reformer 2 are gradually decreased from the stop of the power generation of the SOFC system 100, the flow rates of the city gas and water are required to be decreased. The reason for this is that when the flow rate of the city gas is not decreased, a further decrease in temperature of the fuel cell stack 6 and the reformer 2 becomes more difficult by heat generation of the combustor 20. In addition, when the flow rate of water is not decreased, a S/C value is excessively increased, and as a result, the combustion characteristics of the combustor 20 may be adversely influenced in some cases. In addition, the operation conditions in the following Table 1 are shown by way of example but are not limited thereto.

TABLE 1

|  |  | POWER GENERATION STOP | STAGE 1 | STAGE 2 | STAGE 3 | STAGE 4 | STAGE 5 |
|---|---|---|---|---|---|---|---|
| TEMPERATURE OF FUEL CELL STACK | °C. | 600 | 600 | 550 | 500 | 450 | 400 |
| TEMPERATURE OF REFORMER | °C. | 600 | 550 | 500 | 450 | 400 | 350 |
| FLOW RATE OF CITY GAS | NLM | 2.00 | 0.50 | 0.45 | 0.45 | 0.40 | 0.40 |
| FLOW RATE OF REFORMING WATER | g/min | 4.68 | 1.17 | 1.05 | 1.05 | 0.75 | 0.75 |
| S/C |  |  | 2.50 | 2.50 | 2.50 | 2.50 | 2.00 | 2.00 |

The following Table 2 shows one example of the result of simulation of the composition of the anode off-gas under the operation conditions of each stage from Stage 1 to Stage 5 in Table 1. In particular, when the temperature of the reformer 2, the flow rate of the city gas, and the flow rate of water in Table 2 are known, a reforming reaction in the reformer 2 can be simulated. Accordingly, since the power generation of the fuel cell stack 6 is not performed in the stop control of the SOFC system 100, the composition of the anode off-gas can be calculated by this simulation.

As shown in Table 2, it is found that as the temperature of the reformer 2 is gradually decreased from approximately 550° C., the ratio ($H_2/CH_4$:molar ratio) of the concentration of hydrogen to the concentration of methane in the anode off-gas is gradually decreased from 4.30 due the change in conversion rate or the like of the reformer 2. It is found that when the temperature of the reformer 2 is decreased to a temperature of approximately 450° C. (Stage 3), the concentration of $H_2$ and the concentration of $CH_4$ are close to each other (ratio of $H_2$ to $CH_4$:1.39). It is also found that when the temperature of the reformer 2 is decreased to approximately 400° C. (Stage 4), since the ratio of the concentration of hydrogen to the concentration of methane in the anode off-gas is 0.67, the concentration of methane in the anode off-gas is higher than the concentration of hydrogen.

TABLE 2

|  |  |  | POWER GENERATION STOP | STAGE 1 | STAGE 2 | STAGE 3 | STAGE 4 | STAGE 5 |
|---|---|---|---|---|---|---|---|---|
| ANODE OFF-GAS | $CH_4$ | NLM |  | 0.26 | 0.31 | 0.37 | 0.38 | 0.41 |
|  | $H_2O$ | NLM |  | 0.90 | 0.92 | 1.02 | 0.77 | 0.82 |
|  | $CO_2$ | NLM |  | 0.24 | 0.18 | 0.14 | 0.08 | 0.05 |
|  | CO | NLM |  | 0.09 | 0.03 | 0.01 | 0.00 | 0.00 |
|  | $H_2$ | NLM |  | 1.12 | 0.75 | 0.52 | 0.26 | 0.15 |
|  | $H_2/CH_4$ |  |  | 4.30 | 2.40 | 1.39 | 0.67 | 0.37 |

Accordingly, simulated off-gases shown in the following Table 3 were formed so as to correspond to the compositions of the anode off-gases of Stages 1 to 5 shown in Table 2. Subsequently, experiments in each of which the simulated off-gas was combusted while the air ratio was changed were performed using a single combustion experiment device (not shown) formed only from the combustor 20 shown in FIG. 1.

In addition, a CO gas which is not suitably used for the experiment and which is contained in the anode off-gas shown in Table 2 was replaced as a part of a hydrogen ($H_2$) component in the simulated gas shown in Table 3. In addition, in order to simplify the experiment, a carbon dioxide gas ($CO_2$) and steam ($H_2O$) in the anode off-gas in Table 2 are replaced by a nitrogen gas ($N_2$) in the simulated gas shown in Table 3.

TABLE 3

|  |  |  | POWER GENERATION STOP | STAGE 1 | STAGE 2 | STAGE 3 | STAGE 4 | STAGE 5 |
|---|---|---|---|---|---|---|---|---|
| SIMULATED OFF-GAS | CITY GAS | NLM |  | 0.26 | 0.31 | 0.37 | 0.38 | 0.41 |
|  | $N_2$ | NLM |  | 1.14 | 1.10 | 1.16 | 0.85 | 0.88 |
|  | $H_2$ | NLM |  | 1.21 | 0.78 | 0.53 | 0.26 | 0.15 |

TABLE 3-continued

| | POWER GENERATION STOP | STAGE 1 | STAGE 2 | STAGE 3 | STAGE 4 | STAGE 5 |
|---|---|---|---|---|---|---|
| UPPER LIMIT OF AIR RATIO (EXPERIMENTAL RESULT) | — | | 16.3 | 12.8 | 10.0 | 10.0 |

Figure 2:
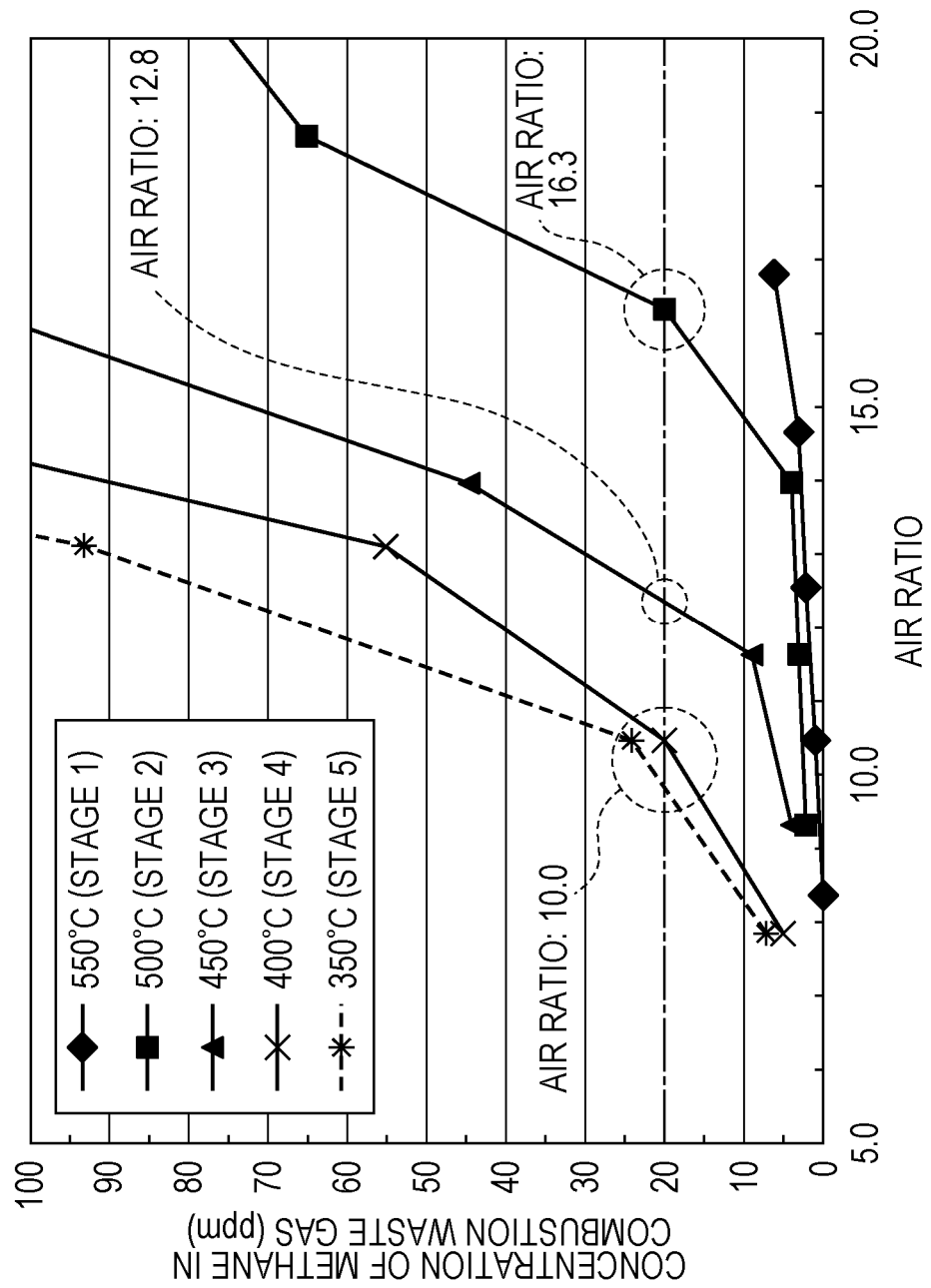
FIG. 2 is a graph showing one example of a result of a combustion experiment of a simulated off-gas using a single combustion experiment device.

FIG. 2 shows one example of the result of the combustion experiment of the simulated off-gas using the single combustion experiment device.

In FIG. 2, the horizontal axis indicates the air ratio, and the vertical axis indicates a methane concentration (ppm) in a combustion exhaust gas discharged from the single combustion experiment device. In addition, in this case, as shown in Table 1, in Stage 4 and Stage 5, since the city gas is supplied at a flow rate of 0.40 NLM, the calorific value of the single combustion experimental device in Stage 4 and Stage 5 is approximately 300 W.

In FIG. 2, a high methane concentration in the combustion exhaust gas indicates that combustible gas combustion in the single combustion experimental device is incomplete combustion, and this methane concentration is required to be decreased to a predetermined value or less.

As understood from FIG. 2, when the temperature of the reformer 2 is high (550° C.) as in the case of Stage 1, regardless of whether the air ratio is high or low, the methane concentration in the combustion exhaust gas is sufficiently low.

However, it is found that as the temperature of the reformer 2 is decreased (as Stage 2 is shifted to Stage 5), in accordance with the increase in air ratio, the concentration of methane in the combustion exhaust gas is rapidly increased.

For example, in the case in which the upper limit of the methane concentration in the combustion exhaust gas is set to 20 ppm, when the temperature of the reformer 2 is 500° C. (Stage 2), at an air ratio of more than 16.3, the combustible gas combustion of the single combustion experiment device may become incomplete combustion in some cases.

When the temperature of the reformer 2 is 450° C. (Stage 3), at an air ratio of more than 12.8, the combustible gas combustion of the single combustion experiment device may become incomplete combustion in some cases.

When the temperature of the reformer 2 is 350° C. or 400° C. (Stage 4 or Stage 5), at an air ratio of more than 10.0, the combustible gas combustion of the single combustion experiment device may become incomplete combustion in some cases.

By the combustible gas combustion experiment using the single combustion experiment device as described above, it was found that as the temperature of the reformer 2 is decreased, the upper limit of the air ratio at which the anode off-gas can be appropriately combusted by the combustor 20 is decreased. That is, it was found that as the molar fraction (β) of the hydrogen component in the anode off-gas is decreased (in other words, as the molar fraction (α) of the methane component in the anode off-gas is increased), the upper limit of the air ratio at which the anode off-gas can be appropriately combusted by the combustor 20 is decreased.

[Operation]

Hereinafter, with reference to the drawings, one example of the operation of the SOFC system 100 of this embodiment will be described. The following operation may be performed by a computing circuit of the controller 40 using a control program from a storage circuit of the controller 40. However, the following operation is not always required to be performed by the controller 40. An operator may perform part of the operation in some cases.

<Change in Temperature of Fuel Cell Stack with Power Generation of SOFC System>

First, the change in stack temperature of the fuel cell stack 6 in association with a series of power generation operation from the start to the stop of the SOFC system 100 will be described.

Figure 3:
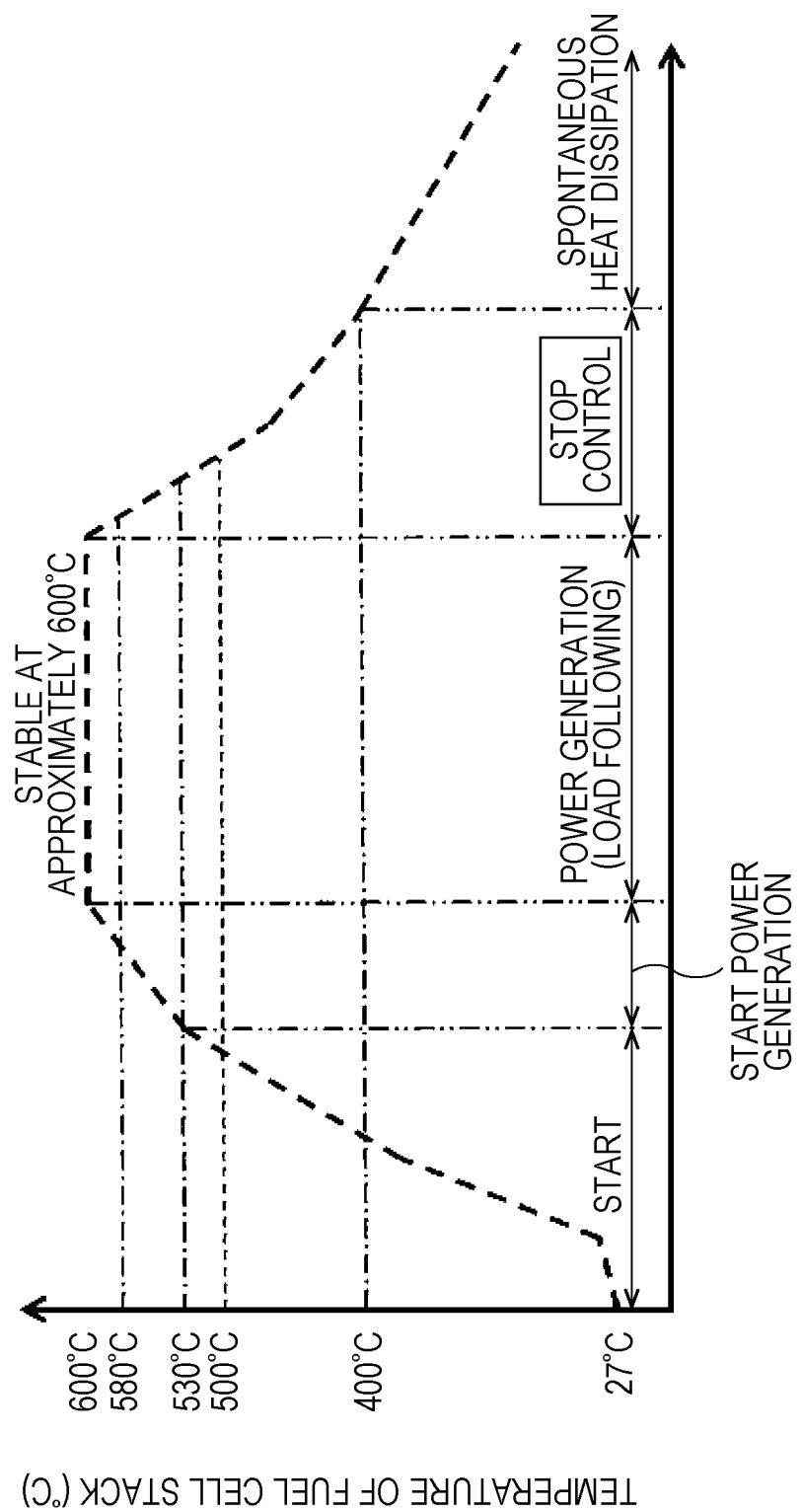
FIG. 3 is a graph showing one example of the change in temperature of a fuel cell stack in association with a power generation operation of an SOFC system 100 of the first embodiment.

FIG. 3 is a graph showing one example of the change in temperature of the fuel cell stack in association with the power generation operation of the SOFC system 100 of the first embodiment.

As shown in FIG. 3, when power generation of the SOFC system 100 corresponding to load is performed, the temperature is required to be increased from ordinary temperature (approximately 20° C.) to a stable power generation temperature (such as approximately 600° C.). That is, when a control operation (operation mode) of the SOFC system 100 is a start control operation (start operation mode), reforming air and a raw material, such as a city gas, are supplied to the anode of the fuel cell stack 6 at ordinary temperature. That is, by the controller 40, the raw material and the reforming air are mixed in advance, and the mixture thus formed is then supplied to the anode of the fuel cell stack 6 through the evaporator 4 and the reformer 2. In addition, the controller 40 controls the air supplier 44 so as to supply air to the cathode of the fuel cell stack 6. In addition, the controller 40 ignites the anode off-gas discharged from the anode of the fuel cell stack 6, and at the same time, the anode off-gas is combusted with the cathode off-gas discharged from the cathode of the fuel cell stack 6 by the combustor 20.

When the temperature of the reformer 2 is increased by the combustion heat, a partial oxidation reforming reaction (PDX) proceeds. Since this partial oxidation reforming reaction (PDX) is an exothermic reaction, this reaction heat can be used to increase the temperature of the SOFC system 100. Accordingly, a starting property of the SOFC system 100 can be improved. Even when the partial oxidation reforming reaction (PDX) proceeds, the combustion reaction between the anode off-gas and the cathode off-gas in the combustion space 25 is maintained.

After a predetermined time passes from the start of the partial oxidation reforming reaction (PDX), or after the reformer 2 is heated to a predetermined temperature or more, the raw material, the reforming air, and steam evaporated from the evaporator 4 are mixed together and are then supplied to the reformer 2. In the reformer 2, an autothermal reforming reaction (ATR) using the partial oxidation reforming reaction (PDX) and a steam reforming reaction (SR) in combination is performed. In this autothermal reforming reaction (ATR), since a thermal balance can be obtained, in the reformer 2, the reaction proceeds while heat self-support is realized.

After a predetermined time passes from the start of the autothermal reforming reaction (ATR), or after the reformer 2 is heated to a predetermined temperature or more, the supply of the reforming air is stopped. Accordingly, the raw material and steam in a mixed state are supplied to the reformer 2. As a result, the reaction is shifted from the autothermal reforming reaction (ATR) to the steam reforming reaction (SR). Although this steam reforming reaction (SR) is an endothermic reaction, at this stage, the surrounding of the reformer 2 is already heated to a sufficiently high temperature (for example, to approximately 500° C. to 600° C.), and hence, the temperature of the fuel cell stack 6 can be stably increased.

When the stack temperature of the fuel cell stack 6 reaches a predetermined power generation temperature lower than a rated temperature which is a temperature of the stack at which a stable power generation is performed at a rated load, the controller 40 controls a switch (not shown) or the like to close a power generation circuit including the fuel cell stack 6. As a result, the fuel cell stack 6 starts the power generation, and an electric current flows in the power generation circuit. In association with the power generation, since the exothermic reaction occurs, the fuel cell stack 6 itself generates heat, and the temperature of the fuel cell stack 6 can be rapidly increased.

That is, as shown in FIG. 3, in a period after the start control operation of the SOFC system 100 and before the temperature of the fuel cell stack 6 reaches a temperature (approximately 600° C.) at which the power generation is performed so that an electric power is stably supplied to an external load, a start power generation control operation is performed. The start power generation control operation is performed in a range in which the temperature of the fuel cell stack 6 is approximately 530° C. to less than 600° C. In order to assist the increase in temperature of the fuel cell stack 6 which is slowly heated as compared to the reformer 2 disposed right above the combustor 20, this start power generation control operation is an operation to start a power generation at a predetermined value or less before the start of a full-scale power generation.

Subsequently, in the SOFC system 100, when the controller 40 judges that the rated temperature or more can be stably maintained, a load following operation (power generation control operation) is started. In addition, the operation in a load following operation state is called a normal operation.

In the power generation control operation of the fuel cell stack 6 described above, when an instruction to stop the power generation in the SOFC system 100 is made, the following stop control (control to stop the power generation) of the SOFC system 100 is then performed.

Figure 4:
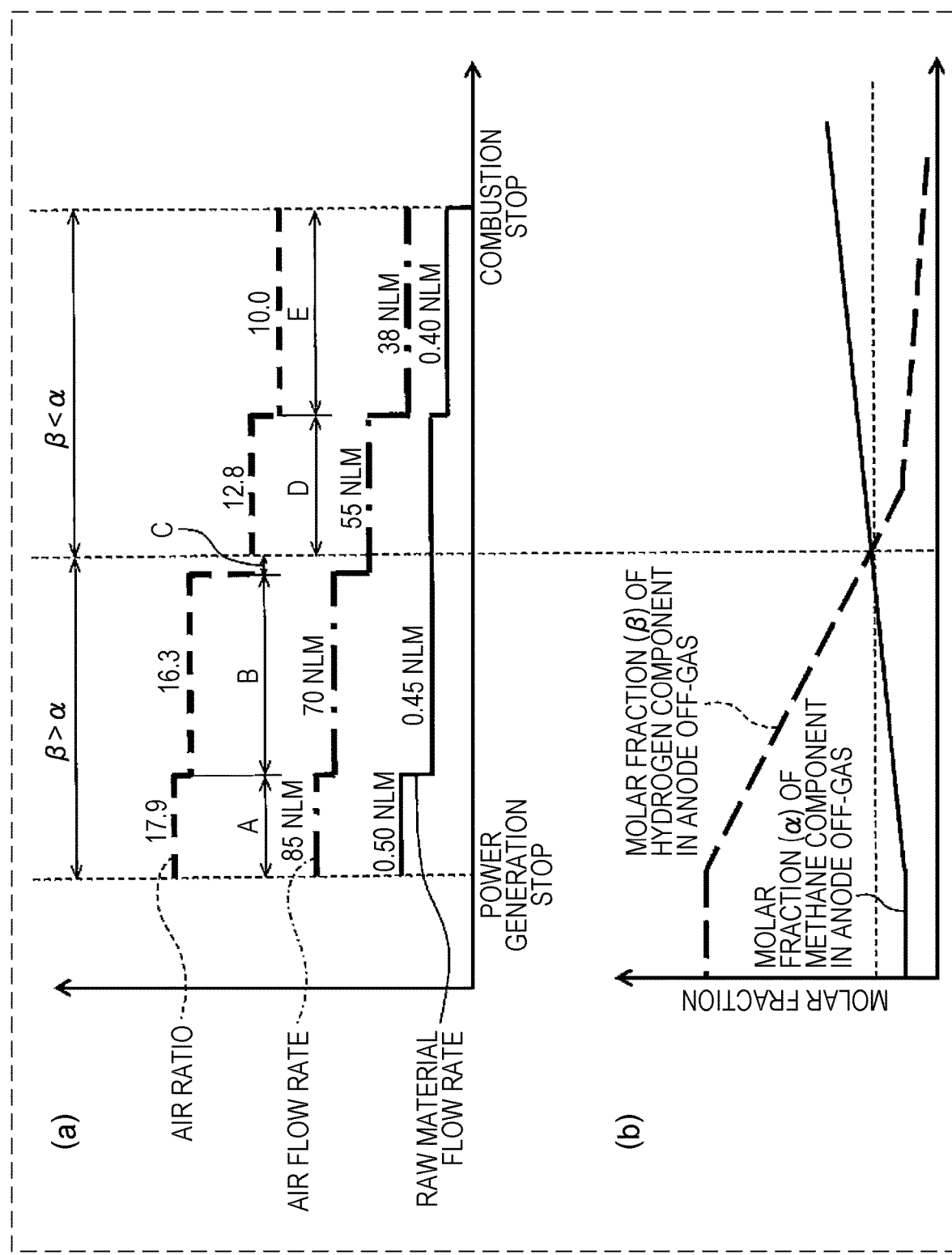
FIG. 4 shows one example of a stop control of the SOFC system of the first embodiment.

FIG. 4 shows one example of the stop control of the SOFC system of the first embodiment.

FIG. 4($b$) shows one example of a profile of the molar fraction ($\alpha$) of the methane component and the molar fraction ($\beta$) of the hydrogen component in the anode off-gas, each of which is changed corresponding to the temperature of the reformer 2.

FIG. 4($a$) shows one example of an air flow rate and a raw material flow rate, each of which is set corresponding to the temperature of the reformer 2. That is, as shown in FIG. 4($a$), the combustion experiment result using the single combustion experiment device shown in FIG. 2 is reflected to the stop control of the SOFC system 100.

In particular, as described above, when the temperature of the reformer 2 is approximately 500° C., at an air ratio of more than 16.3, the combustible gas combustion of the combustor 20 may become incomplete combustion in some cases. Hence, at this stage, the raw material flow rate is changed from 0.50 NLM to 0.45 NLM, and at the same time, the air flow rate is changed from 85 NLM to 70 NLM. Accordingly, the air ratio can be decreased from 17.9 to 16.3. In addition, in association with the decrease in temperature of the SOFC system 100, when the raw material flow rate is decreased, the temperature of the SOFC system 100 can be effectively decreased.

In addition, the reason the air ratio is set to 17.9 immediately after the power generation stop of the fuel cell stack 6 is that this air ratio is the maximum value of the rated output of the air supplier 44 (such as a blower).

In addition, when the temperature of the reformer 2 is approximately 450° C., at an air ratio of more than 12.8, the combustible gas combustion of the combustor 20 may become incomplete combustion in some cases. Hence, at this stage, the air flow rate is changed from 70 to 55 NLM. Accordingly, the air ratio can be decreased from 16.3 to 12.8.

In addition, when the temperature of the reformer 2 is approximately 400° C., at an air ratio of more than 10.0, the combustible gas combustion of the combustor 20 may become incomplete combustion in some cases. Hence, at this stage, the raw material flow rate is changed from 0.45 to 0.40 NLM, and at the same time, the air flow rate is changed from 55 to 38 NLM. Accordingly, the air ratio can be decreased from 12.8 to 10.0. In addition, in association with the decrease in temperature of the SOFC system 100, when the raw material flow rate is decreased, the temperature of the SOFC system 100 can be effectively decreased.

In addition, when times A, B, C, D, and E are as shown in FIG. 4, the first average value of the air ratio obtained when the molar fraction ($\beta$) of the hydrogen component in the anode off-gas is higher than the molar fraction ($\alpha$) of the methane component in the anode off-gas ($\beta > \alpha$) can be calculated by the equation: $[(17.9 \times A + 16.3 \times B + 12.8 \times C)/(A+B+C)]$.

In addition, the second average value of the air ratio obtained when the molar fraction ($\beta$) of the hydrogen component in the anode off-gas is lower than the molar fraction ($\alpha$) of the methane component in the anode off-gas ($\beta < \alpha$) can be calculated by the equation: $[(12.8 \times D + 10.0 \times E)/(D+E)]$.

Hence, as easily understood from FIG. 4, since the air ratio in the case of the latter ($\beta < \alpha$:D+E) is lower than that in the case of the former ($\beta > \alpha$:A+B), the second average value of the air ratio in the case of the latter ($\beta < \alpha$) is lower than the first average value of the air ratio of the former ($\beta > \alpha$). That is, the first average value is higher than the second average value.

Next, when the temperature of the fuel cell stack 6 is lower than approximately 400° C., even if air flows to the anode of the fuel cell stack 6, oxidation of nickel of the anode is not likely to occur. Hence, at this stage, the raw material flow rate is set to zero, and the combustible gas combustion of the combustor 20 is stopped. However, in this case, although not shown in the drawing, when air supply is continuously performed to the cathode of the fuel cell stack 6 (for example, the air flow rate is increased to approximately 60.0 NLM), the temperature of the SOFC system 100 can be rapidly decreased as compared to the case in which the air supply is not continuously performed.

Subsequently, when the temperature of the SOFC system 100 is decreased to an appropriate temperature so as to appropriately restart the SOFC system 100, or when a predetermined time (such as some hours) passes after the air flow rate is increased to approximately 60.0 NLM, the air supply to the cathode of the fuel cell stack 6 is stopped, and the stop control of the SOFC system 100 is ended.

In addition, the SOFC system 100 is then placed in a waiting mode waiting a successive restart instruction.

In addition, although not shown in the drawing, the air flow rate (85 NLM) immediately after the power generation stop of the fuel cell stack 6 is set to a sufficiently large value as compared to the air flow rate (such as 45 NLM) in the power generation operation of the fuel cell stack 6. In addition, the raw material flow rate (0.50 NLM) immediately after the power generation stop of the fuel cell stack 6 is set to a sufficiently small value as compared to the raw material flow rate (such as 2.08 NLM) in the power generation operation of the fuel cell stack 6. As a result, after the power generation stop of the fuel cell stack 6, the temperature of the SOFC system 100 can be rapidly decreased.

In addition, the flow rate of water supplied to the reformer 2 is set so that S/C in the reformer 2 has a predetermined value (such as approximately 2.0 to 2.5).

In addition, the flow rates and the temperatures described above are shown by way of example but are not limited thereto.

Figure 5:
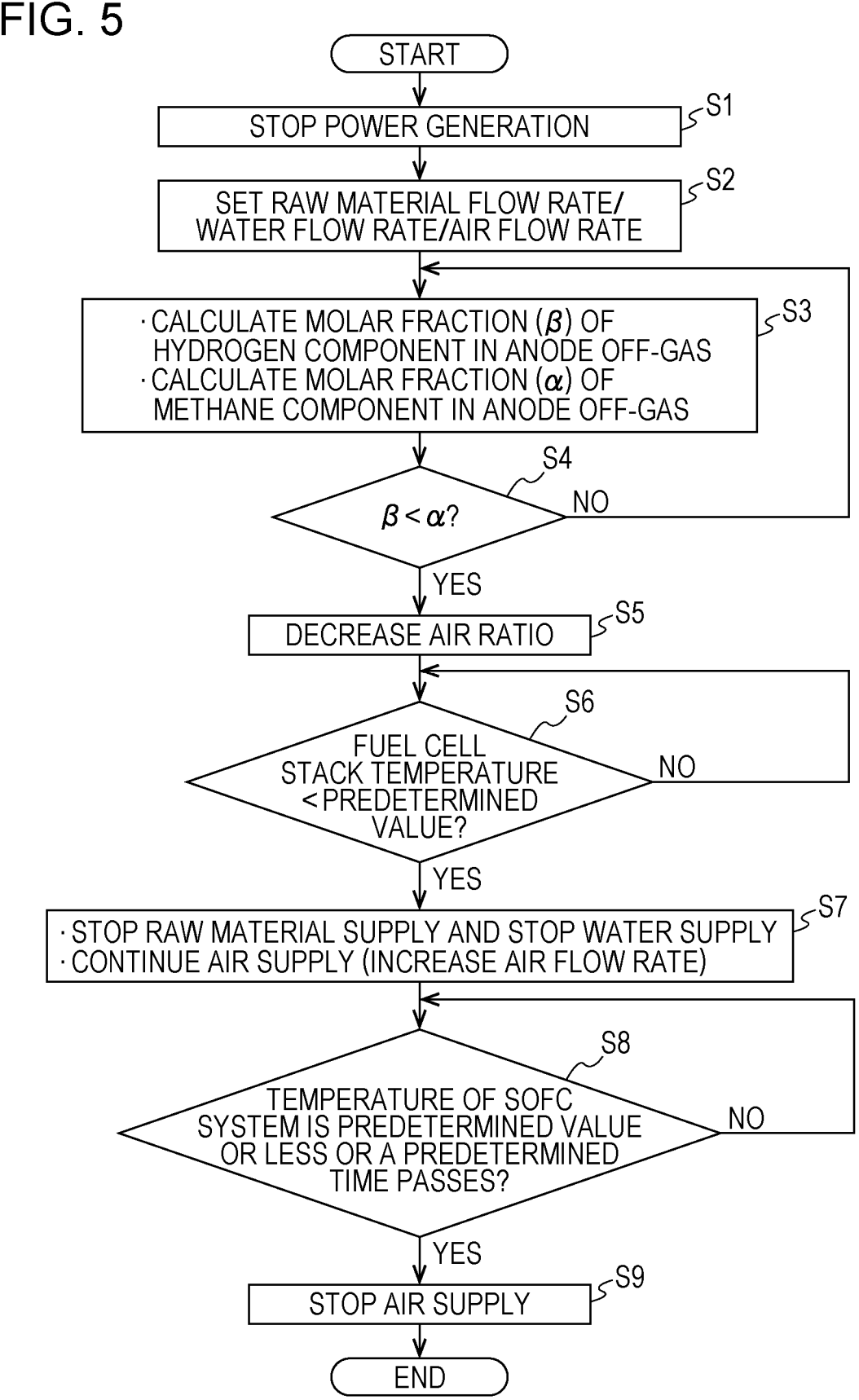
FIG. 5 is a flowchart showing one example of an operation of the SOFC system of the first embodiment.

FIG. 5 is a flowchart showing one example of the operation of the SOFC system of the first embodiment.

First, in the power generation control operation of the fuel cell stack 6, when an instruction to stop the power generation in the SOFC system 100 is made (Step S1), in Step S2, the flow rate of the raw material supplied to the reformer 2, the flow rate of water supplied to the reformer 2, and the flow rate of air supplied to the cathode of the fuel cell stack 6 are each set to an appropriate value immediately after the power generation stop of the fuel cell stack 6.

For example, as shown in FIG. 4, the flow rate of the raw material and the flow rate of air may be set to 0.5 NLM and 85 NLM, respectively, but are not limited thereto. In addition, the flow rate of water may be set so that S/C in the reformer 2 is 2.0 but is not limited thereto.

Next, in Step S3, the molar fraction (β) of the hydrogen component in the anode off-gas and the molar fraction (α) of the methane component in the anode off-gas are calculated. In particular, when the temperature of the reformer 2, the flow rate of the raw material, and the flow rate of water in Step S2 are known, the molar fraction (β) and the molar fraction (α) described above can be obtained by simulation of a reforming reaction in the reformer 2.

Next, in Step S4, the molar fraction (β) of the hydrogen component in the anode off-gas and the molar fraction (α) of the methane component in the anode off-gas are compared to each other, and whether the molar fraction (β) is lower than the molar fraction (α) or not is judged.

When the molar fraction (β) is higher than the molar fraction (α) (in the case in which "No" in Step S4), the operation is returned to Step S3, and the operation from Step S3 is repeatedly performed.

When the molar fraction (β) is lower than the molar fraction (α) (in the case of "Yes" in Step S4), the air ratio is decreased in Step S5. In addition, the decrease in air ratio may be performed, for example, in such a way that the flow rate of the raw material in Step S2 is maintained constant, and the flow rate of air in Step S2 is decreased or may be performed in such a way that a decrease in flow rate of air in Step S2 is set to be larger than a decrease in flow rate of the raw material in Step S2.

Next, in Step S6, whether the temperature of the fuel cell stack 6 reaches a predetermined value or not is judged. The predetermined value in Step S6 may be set to an appropriate temperature (for example, to approximately 400° C.) at which nickel of the anode of the fuel cell stack 6 is not oxidized. In addition, this temperature is shown by way of example but is not limited thereto.

When the temperature of the fuel cell stack 6 does not reach the predetermined value (in the case of "No" in Step S6), the state described above is maintained.

When the temperature of the fuel cell stack 6 reaches the predetermined value (in the case of "Yes" in Step S6), in Step S7, the supply of the raw material and the supply of water to the reformer 2 are stopped. However, the supply of air to the cathode of the fuel cell stack 6 is continuously performed after the flow rate of air is appropriately changed. For example, as shown in FIG. 4, when the flow rate of air is increased from approximately 38 NLM to approximately 60.0 NLM, although the temperature of the SOFC system 100 can be rapidly decreased, the increase in flow rate of air is not limited thereto.

Next, in Step S8, whether the temperature of the SOFC system 100 is decreased to a predetermined temperature or less or not is judged, and at the same time, whether a predetermined time (such as some hours) passes from the operation in Step S7 or not is also judged. In addition, the predetermined temperature in Step S8 is set to an appropriate temperature at which the SOFC system 100 can be appropriately restarted.

When the temperature of the SOFC system 100 is not decreased to the predetermined temperature or less, and in addition, the predetermined time from the operation in Step S7 does not pass (in the case of "No" in Step S8), the state described above is maintained.

When the temperature of the SOFC system 100 is decreased to the predetermined temperature or less, or the predetermined time from the operation in Step S7 passes (in the case of "Yes" in Step S8), in Step S9, the air supply to the cathode of the fuel cell stack 6 is stopped, and the stop control of the SOFC system 100 is ended.

As described above, in the stop control of the SOFC system 100 in which after the power generation is stopped, the supply of the raw material and air to the fuel cell stack 6 is continuously performed, according to the SOFC system 100 of this embodiment, since the flow rate of air is appropriately set in consideration of combustion characteristics of the combustor 20, the degradation in durability of the fuel cell stack 6 can be suppressed as compared to that in the past. In addition, the SOFC system 100 of this embodiment can also decrease the stop time in this stop control as compared to that in the past.

In particular, when the molar fraction (β) of the hydrogen component in the anode off-gas is higher than the molar fraction (α) of the methane component in the anode off-gas (β>α), since the composition of the anode off-gas flowing in the combustor 20 is a hydrogen component-dominant composition, even when lean combustion occurs in the combustor 20, the flame is not likely to go out. That is, even when the fuel in the combustor 20 is lean, the flame by hydrogen combustion having a rapid combustion rate is not likely to go out as compared to the flame by methane combustion having a slow combustion rate. Hence, at this stage, when the flow rate of air supplied to the cathode of the fuel cell stack is increased (that is, when the first average value of the air ratio is increased), the temperature of the SOFC system 100 can be rapidly decreased, and hence, the stop time in the stop control of the SOFC system can be decreased as compared to that in the past.

On the other hand, when the molar fraction (β) of the hydrogen component in the anode off-gas is lower than the molar fraction (α) of the methane component in the anode off-gas (β<α), since the composition of the anode off-gas flowing in the combustor 20 is a methane component-dominant composition, when lean combustion occurs in the combustor 20, the flame is liable to go out. That is, when the fuel in the combustor 20 is lean, the flame by methane combustion having a slow combustion rate is more liable to go out as compared to the flame by hydrogen combustion having a rapid combustion rate. Hence, at this stage, when the flow rate of air supplied to the cathode of the fuel cell stack 6 is decreased (that is, when the second average value of the air ratio is decreased), the combustion stability of the combustor 20 can be improved. Hence, the probability in that since the flame of the combustor 20 goes out, the fuel gas cannot be supplied to the anode of the fuel cell stack 6, and air flows to the anode can be reduced, and as a result, the degradation in durability of the fuel cell stack 6 can be suppressed as compared to that in the past.

Second Embodiment

[Device Structure]

Figure 6:
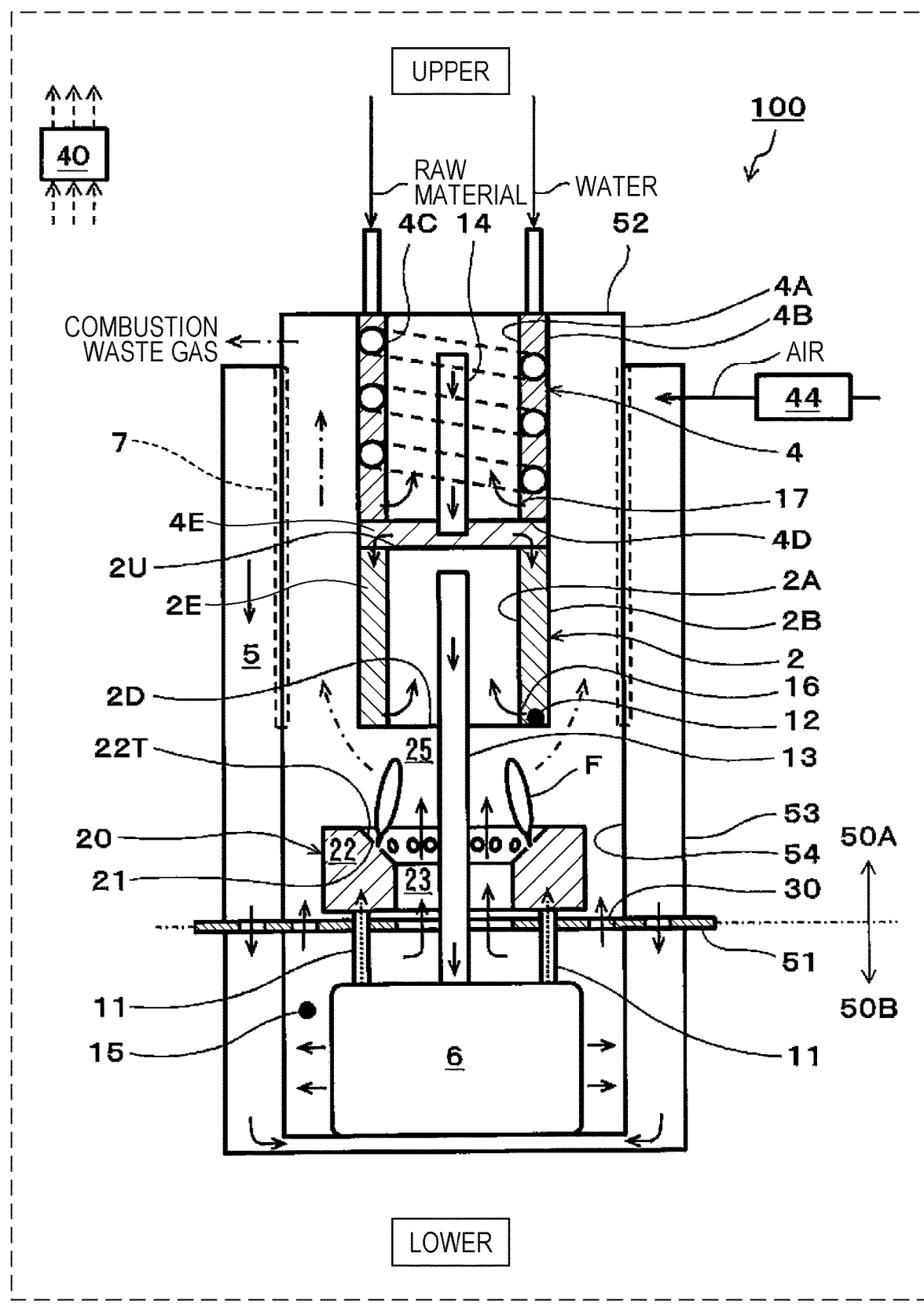
FIG. 6 is a schematic view showing one example of a SOFC system of a second embodiment.

FIG. 6 is a schematic view showing one example of a SOFC system of a second embodiment.

A SOFC system 100 of this embodiment is similar to the SOFC system 100 of the first embodiment except for that the following first temperature detector 12 and second temperature detector 15 are further included and except for the following control content of the controller 40.

The first temperature detector 12 is a sensor detecting the temperature of the reformer 2. The first temperature detector 12 may have any structure as long as the temperature of the reformer 2 can be detected.

In the SOFC system 100 of this embodiment, the first temperature detector 12 is provided for the reformer 2. As the first temperature detector 12, for example, although a thermocouple or a thermistor may be mentioned, the first temperature detector 12 is not limited thereto.

The second temperature detector 15 is a sensor detecting the temperature of the fuel cell stack 6. The second temperature detector 15 may be provided at any place as long as the temperature of the fuel cell stack 6 can be detected. For example, the second temperature detector 15 may be provided either for the fuel cell stack 6 or for the periphery thereof. In the SOFC system 100 of this embodiment, the second temperature detector 15 is provided for the periphery of the fuel cell stack 6.

In addition, the second temperature detector 15 may have any structure as long as the temperature of the fuel cell stack 6 can be detected. As the second temperature detector 15, for example, although a thermocouple or a thermistor may be mentioned, the second temperature detector 15 is not limited thereto.

In addition, the temperature of the reformer 2 and the temperature of the fuel cell stack 6 have a predetermined relationship. Hence, instead of the first temperature detector 12, the second temperature detector 15 may indirectly detect the temperature of the reformer 2. Alternatively, instead of the second temperature detector 15, the first temperature detector 12 may indirectly detect the temperature of the fuel cell stack 6. The temperatures detected by the first temperature detector 12 and the second temperature detector 15 are appropriately sent to the controller 40.

In the stop control of the SOFC system 100 in which the fuel gas and air are continuously supplied to the fuel cell stack 6 after the power generation is stopped, the controller 40 may control the air supplier 44 based on the temperature detected by the first temperature detector 12 or the second temperature detector 15. In particular, in this stop control, the controller 40 may control the air supplier 44 so as to decrease the air ratio as the temperature detected by the first temperature detector 12 or the second temperature detector 15 is decreased.

[Operation]

Figure 7:
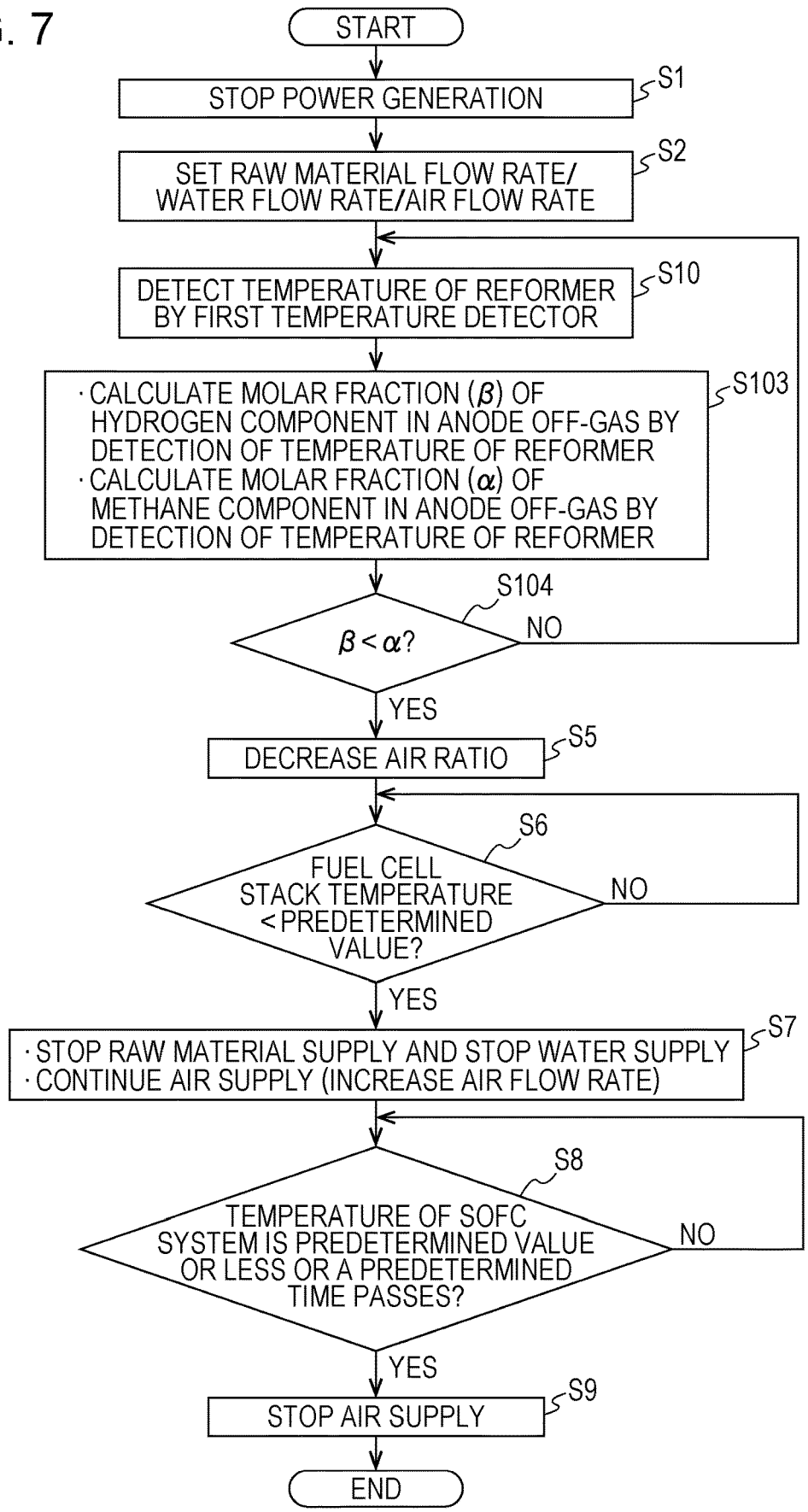
FIG. 7 is a flowchart showing one example of an operation of the SOFC system of the second embodiment.

FIG. 7 is a flowchart showing one example of an operation of the SOFC system of the second embodiment. The following operation may be performed by a computing circuit of the controller 40 using a control program from a storage circuit of the controller 40. However, the following operation is not always required to be performed by the controller 40. An operator may perform part of the operation in some cases.

Step S1, Step S2, and Step S5 to Step S9 in FIG. 7 are similar to Step S1, Step S2, and Step S5 to Step S9 in FIG. 5, respectively. Hence, description of those Step S1, Step S2, and Step S5 to Step S9 will be omitted or simplified.

After the flow rate of the raw material, the flow rate of water, and the flow rate of air are each set to an appropriate value in Step S2 immediately after the power generation stop of the fuel cell stack 6, in Step S10, the temperature of the reformer 2 is detected by the first temperature detector 12. In addition, instead of the first temperature detector 12, the temperature of the reformer 2 may be indirectly detected by the second temperature detector 15.

Next, since the temperature of the reformer 2 is detected, in Step S103, the molar fraction ($\beta$) of the hydrogen component in the anode off-gas and the molar fraction ($\alpha$) of the methane component in the anode off-gas are calculated. In particular, when the flow rate of the raw material and the flow rate of water in Step S2 are known, the molar fraction ($\alpha$) and the molar fraction ($\beta$) can be precisely obtained by detecting the temperature of the reformer 2. That is, from the temperature of the reformer 2 thus detected, the flow rate of the city gas, and the flow rate of water, a reforming reaction in the reformer 2 can be simulated.

Hence, in the following Step S104, the molar fraction ($\beta$) of the hydrogen component in the anode off-gas and the molar fraction ($\alpha$) of the methane component in the anode off-gas are precisely compared to each other, and whether the molar fraction ($\beta$) is lower than the molar fraction ($\alpha$) or not is judged.

When the molar fraction ($\beta$) is higher than the molar fraction ($\alpha$) (in the case of "No" is Step S104), the operation is returned to Step S10, and the operation from Step S10 is repeatedly performed.

When the molar fraction ($\beta$) is lower than the molar fraction ($\alpha$) (in the case of "Yes" is Step S104), in Step S5, the air ratio is decreased.

As described above, whether the composition of the anode off-gas flowing in the combustor 20 from the anode of the fuel cell stack 6 is a hydrogen component-dominant composition or a methane component-dominant composition can be known when the temperature of the reformer 2 is detected. Hence, in the SOFC system 100 of this embodiment, when the air supplier 44 is controlled based on the temperature detected by the first temperature detector 12 or the second temperature detector 15, the flow rate of air supplied to the cathode of the fuel cell stack 6 can be appropriately set.

In addition, the composition of the anode off-gas flowing in the combustor 20 from the anode of the fuel cell stack 6 is changed from a hydrogen component-dominant composition to a methane component-dominant composition due to the change in conversion rate or the like of the reformer 2 in association with the decrease in temperature of the reformer 2. Hence, in the SOFC system 100 of this embodiment, in association with the decrease in temperature detected by the first temperature detector 12 or the second temperature detector 15, since the flow rate of air supplied to the fuel cell stack 6 is decreased by controlling the air supplier 44, the flow rate of air supplied to the cathode of the fuel cell stack 6 can be appropriately set.

In addition, the "in association with the decrease in temperature detected by the first temperature detector 12 or the second temperature detector 15, the flow rate of air supplied to the fuel cell stack 6 is decreased by controlling the air supplier 44" may be performed in such a way that in association with the decrease in temperature detected by the first temperature detector 12 or the second temperature detector 15, the flow rate of air supplied to the cathode of the fuel cell stack 6 is decreased continuously or in a stepwise manner.

The SOFC system 100 of this embodiment may be similar to the SOFC system 100 of the first embodiment except for the features described above.

Third Embodiment

Figure 8:
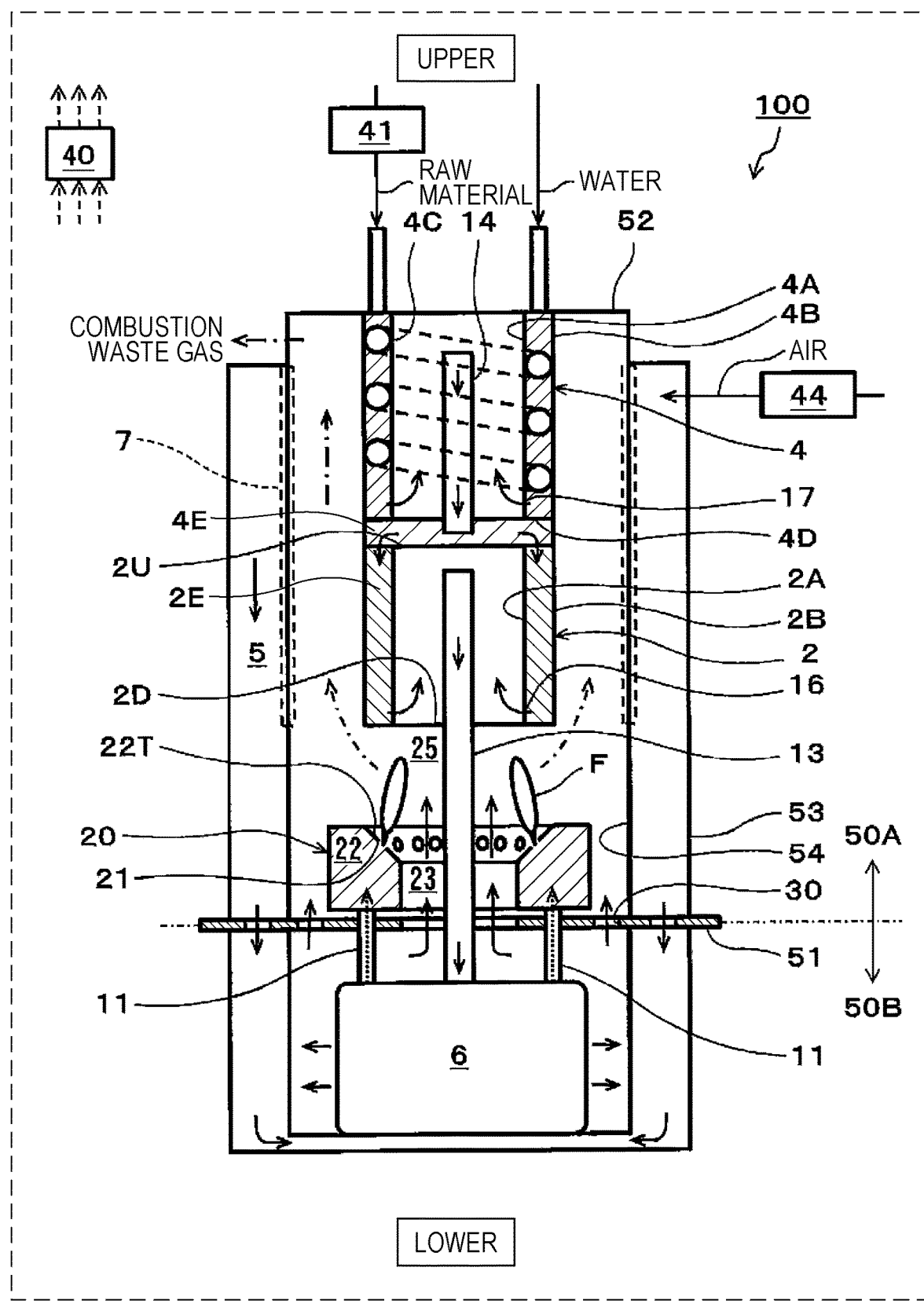
FIG. 8 is a schematic view showing one example of a SOFC system of a third embodiment.

FIG. 8 is a schematic view showing one example of a SOFC system of a third embodiment.

A SOFC system 100 of this embodiment is similar to the SOFC system 100 of the first embodiment except for that the following raw material supplier 41 is further included and except for the following control content of the controller 40.

The raw material supplier 41 is a device supplying the raw material to the reformer 2. The raw material supplier 41 may have any structure as long as the raw material can be supplied to the reformer 2. As the raw material supplier 41, for example, although a pump may be mentioned, the raw material supplier 41 is not limited thereto.

In the stop control of the SOFC system 100 in which the fuel gas and air are continuously supplied to the fuel cell stack 6 after the power generation is stopped, the controller 40 controls the raw material supplier 41 so that the amount of the raw material supplied to the reformer 2 is set to a flow rate corresponding to a calorific value of 300 W or more.

In FIG. 2, as described above, in Stage 4 and Stage 5, since the city gas is supplied at a flow rate of 0.40 NLM, the calorific value of the single combustion experiment device in Stage 4 and Stage 5 is approximately 300 W.

However, in Stage 4 and Stage 5, since the temperature of the SOFC system 100 is decreased, as the flow rate of the city gas is increased, the temperature of the SOFC system 100 is not likely to be decreased due to combustion heat of the combustor 20, and the stop time of the SOFC system 100 may be difficult to be decreased in some cases.

Accordingly, in Stage 4 and Stage 5, when a combustion experiment in which the city gas was supplied at a flow rate of 0.30 NLM (calorific value: 210 W) was performed by the single combustion experiment device, even if the air ratio was variously changed, the methane concentration in a combustion exhaust gas is high, such as 20 ppm or more, and hence, complete combustion could not be performed. The reason for this is estimated that an amount of heat required for a combustion chemical reaction by which methane is decomposed is difficult to obtain from this calorific value (210 W).

That is, in the stop control of the SOFC system 100, in order to stably perform combustible gas combustion of the combustor 20, as the calorific value of the combustor 20, at least approximately 300 W is required. In addition, the upper limit of the calorific value of the combustor 20 may be set, for example, to approximately a calorific value (700 W) which corresponds to the minimum power generation in the power generation control operation of the SOFC system 100.

As described above, when the composition of the anode off-gas flowing in the combustor 20 from the anode of the fuel cell stack 6 is a methane component-dominant composition, in the case in which the amount of a methane gas supplied to the reformer 2 is set to less than a flow rate corresponding to a calorific value of 300 W, due to an insufficient amount of heat of the combustible gas combustion of the combustor 20, the combustible gas combustion may be probably not maintained in some cases. However, the SOFC system 100 of this embodiment can reduce the probability as described above by the structure described above.

The SOFC system 100 of this embodiment may be similar to the SOFC system 100 of the first embodiment or the second embodiment except for the features described above.

Fourth Embodiment

Figure 9:
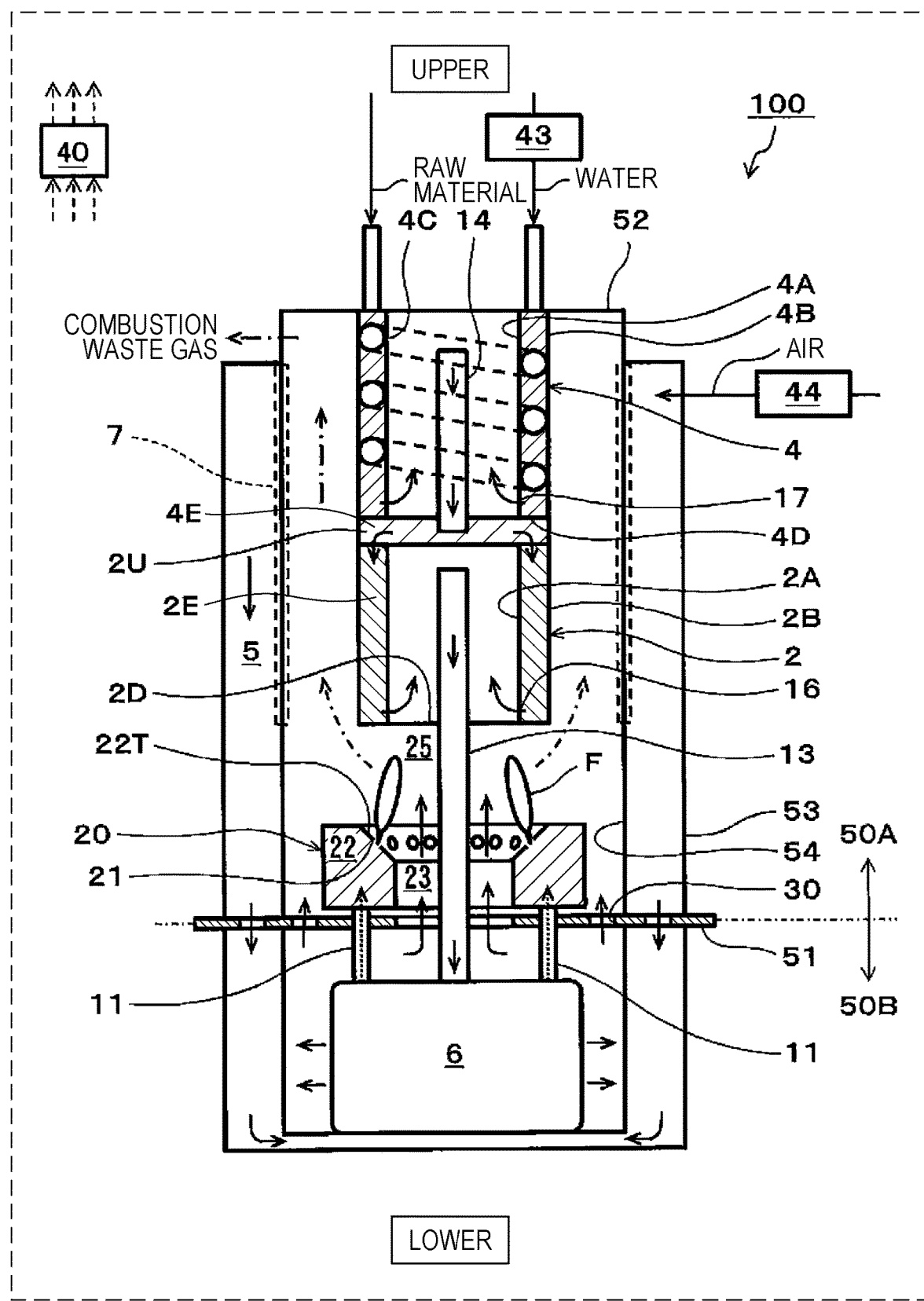
FIG. 9 is a schematic view showing one example of a SOFC system of a fourth embodiment.

FIG. 9 is a schematic view showing one example of a SOFC system of a fourth embodiment.

A SOFC system 100 of this embodiment is similar to the SOFC system 100 of the first embodiment except for that the following water supplier 43 is further included and except for the following control content of the controller 40.

The water supplier 43 is a device supplying water to the reformer 2. The water supplier 43 may have any structure as long as water can be supplied to the reformer 2. As the water supplier 43, for example, although a pump may be mentioned, the water supplier 43 is not limited thereto.

In the stop control of the SOFC system 100 in which the fuel gas and air are continuously supplied to the fuel cell stack 6 after the power generation is stopped, the controller 40 controls the water supplier 43 so that S/C in the reformer 2 is set to 2.0 or more.

In the power generation control operation and the stop control of the SOFC system 100, in order to suppress carbon precipitation on the reforming catalyst 2E, S/C in the reformer 2 is set to at least 1.5 or more, and in consideration of the variation in water supply operation of the water supplier 43, water is preferably supplied to the reformer 2 so that S/C is 2.0 or more. In addition, when S/C in the reformer 2 is excessively increased, combustible gas combustion of the combustor 20 is adversely influenced; hence, the upper limit of S/C is preferably set, for example, to approximately 3.0.

As described above, when S/C in the reformer 2 is set to less than 2.0, carbon precipitation is generated on the reforming catalyst 2E, and the reforming catalyst 2E may be probably degraded in some cases; however, in the SOFC system 100 of this embodiment, by the structure as described above, the probability of the degradation as described above can be reduced.

The SOFC system 100 of this embodiment may be similar to the SOFC system 100 of any one of the first embodiment, the second embodiment, and the third embodiment except for the features described above.

Fifth Embodiment

Figure 10:
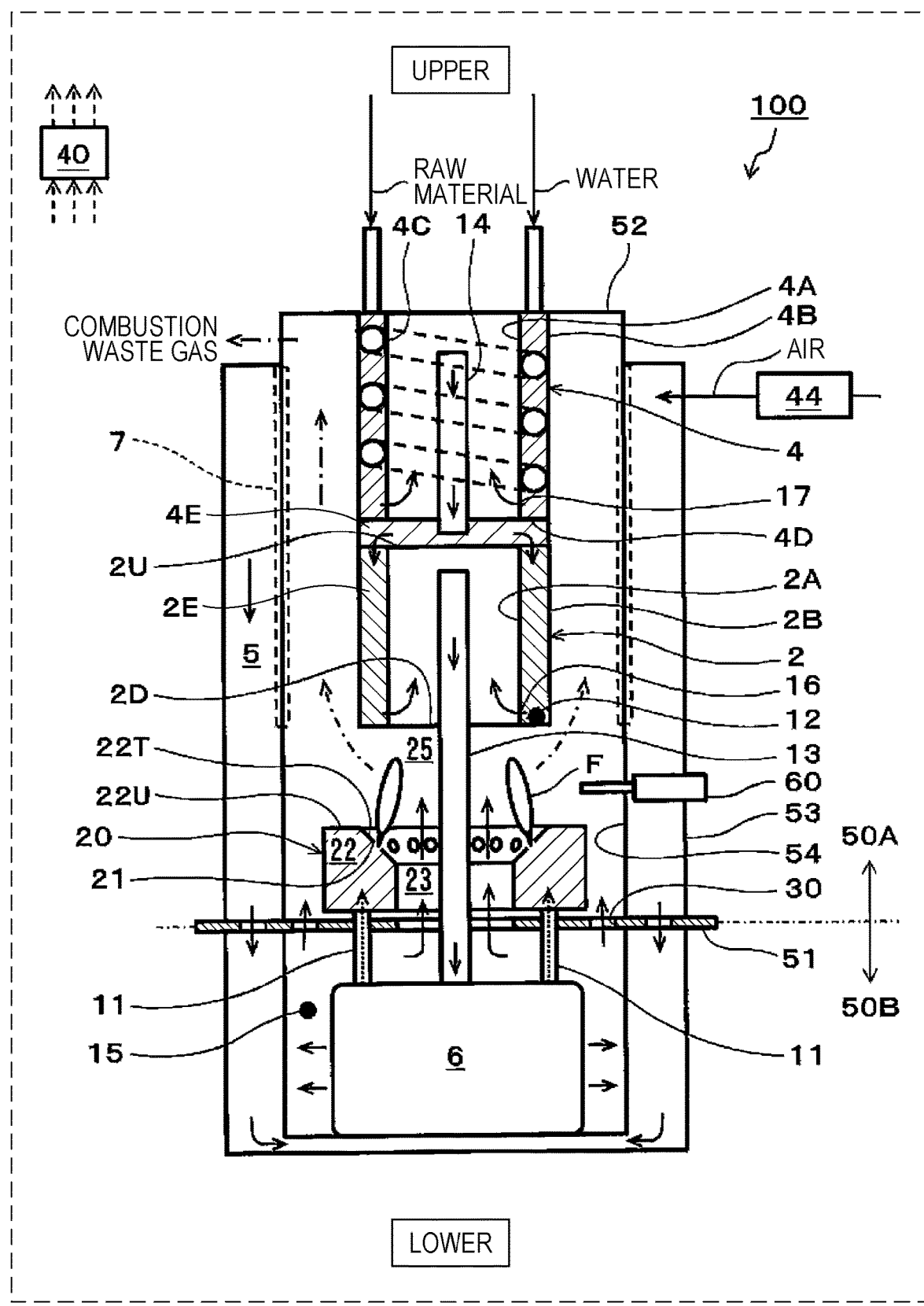
FIG. 10 is a schematic view showing one example of a SOFC system of a fifth embodiment.

FIG. 10 is a schematic view showing one example of a SOFC system of a fifth embodiment.

A SOFC system 100 of this embodiment is similar to the SOFC system 100 of the second embodiment except for that the following ignition device 60 is further included and except for the following control content of the controller 40.

The ignition device 60 is a device igniting the combustor 20. The ignition device 60 may have any structure as long as capable of igniting the combustor 20. As the ignition device 60, for example, although an ignition heater or an ignition plug may be mentioned, the ignition device 60 is not limited thereto.

In this embodiment, the SOFC system 100 is configured so that the anode off-gas discharged from the fuel cell stack 6 is supplied to the combustor 20 having a torus structure and is then sprayed to the combustion space 25 at a predetermined rate, and at the same time, the cathode off-gas discharged from the fuel cell stack 6 is sprayed to the combustion space 25 from the periphery of the combustor 20. In addition, by the ignition device 60, the anode off-gas is ignited in the combustion space 25, and diffusion combustion is performed together with the cathode off-gas sprayed from the central portion and the periphery of the combustor 20.

In the stop control of the SOFC system 100 in which the fuel gas and air are continuously supplied to the fuel cell stack 6 after the power generation is stopped, the controller 40 control the ignition device 60 to ignite the combustor 20 when the temperature detected by the first temperature detector 12 or the second temperature detector 15 is decreased by a predetermined value or more in a predetermined time or at predetermined time intervals.

When the temperature detected by the first temperature detector 12 or the second temperature detector 15 is decreased by a predetermined value or more in a predetermined time, the flame of the combustor 20 may probably go out in some cases. For example, when the temperature thus detected is decreased by approximately 20° C. or more within a couple of minutes, the flame of the combustor 20 may probably go out in some cases; however, those time and temperature are described by way of example and are not limited to those described in this example. Hence, in the case described above, according to the SOFC system 100 of this embodiment, since the combustor 20 is ignited, the state in which the flame of the combustor 20 goes out can be suppressed from being continued. That is, a normal combustion state can be rapidly recovered from the state in which the flame of the combustor 20 goes out.

In addition, in the SOFC system 100 of this embodiment, since the combustor 20 is ignited at predetermined time intervals, the probability of forming the state in which the flame of the combustor 20 goes out can be reduced. For example, when the combustor 20 is ignited approximately every 30 minutes, the probability of forming the state in which the flame of the combustor 20 goes out can be reduced; however, this time is described by way of example and is not limited to that of this example.

In addition, even if the flame of the combustor 20 is in a normally combusted state, the operation of the ignition device 60 for a short time may not cause any problems.

The SOFC system 100 of this embodiment may be similar to the SOFC system 100 of any one of the first embodiment, the second embodiment, the third embodiment, and the fourth embodiment except for the features described above.

In addition, the first embodiment, the second embodiment, the third embodiment, the fourth embodiment, and the fifth embodiment may be used in combination as long as not conflicting with each other.

From the above description, various improvements of the present disclosure and other embodiments are apparent for a person skilled in the art. Hence, the above description is to be understood as examples and is provided to suggest the most preferable aspect for carrying out the present disclosure to a person skilled in the art. The details of the structure and/or the function of the present disclosure may be substantially changed or modified without departing from the spirit of the present disclosure.

According to the aspect of the present disclosure, in the stop control of the SOFC system in which the fuel gas and air are continuously supplied to the fuel cell stack after the power generation is stopped, since the flow rate of air is appropriately set in consideration of combustion characteristics of the combustor, a SOFC system capable of suppressing degradation in durability of the fuel cell stack as compared to that in the past can be provided. In addition, according to the aspect of the present disclosure, a SOFC system capable of decreasing the stop time in the above stop control as compared to that in the past can be provided.

What is claimed is:

1. A solid oxide fuel cell system comprising:
   a fuel cell stack generating a power using a fuel gas and air;
   a reformer generating the fuel gas by reforming a raw material;
   an air supplier supplying the air to the fuel cell stack:
   a combustor combusting an anode off-gas and a cathode off-gas each discharged from the fuel cell stack;
   a controller,
      wherein in a stop control of the solid oxide fuel cell system in which the fuel gas and the air are continuously supplied to the fuel cell stack after power generation is stopped,
      the controller is programmed to calculate an average value of ratios of the air to the raw material supplied to the reformer as a first average value, when a molar fraction of a hydrogen component in the anode off-gas is higher than a molar fraction of a raw material component in the anode off-gas,
      the controller is programmed to calculate an average value of the ratios of the air to the raw material supplied to the reformer as a second average value, when the molar fraction of the hydrogen component in the anode off-gas is lower than the molar fraction of the raw material component in the anode off-gas, and
      the controller is programmed to control the air supplier so that the first average value is higher than the second average value; and
   a temperature detector detecting a temperature of the reformer, wherein in the stop control, the controller is programmed to control the air supplier based on the temperature detected by the temperature detector,
      wherein in the stop control, the controller is programmed to control the air supplier to decrease the ratio of the air to the raw material supplied to the reformer when calculating the first average value and the second average value, and wherein the controller is programmed to control the air supplier as the temperature detected by the temperature detector is decreased.

2. The solid oxide fuel cell system according to claim 1, wherein the temperature detector is located in or adjacent to the reformer.

3. The solid oxide fuel cell system according to claim 1, wherein the temperature detector is located in the fuel cell stack or adjacent thereto.

4. The solid oxide fuel cell system according to claim 1, further comprising a raw material supplier supplying the raw material to the reformer,
   wherein in the stop control, the controller is programmed to control the raw material supplier so as to set a supply amount of the raw material supplied to the reformer to a flow rate corresponding to a calorific value of 300 W or more.

5. The solid oxide fuel cell system according to claim 1, further comprising
   a water supplier supplying water to the reformer,
   wherein in the stop control, the controller is programmed to control the water supplier so as to set S/C in the reformer to 2.0 or more.

6. The solid oxide fuel cell system according to claim 1, further comprising
   an ignition device igniting the combustor,
   wherein in the stop control, the controller is programmed to control the ignition device to ignite the combustor when the temperature detected by the temperature detector is decreased by a predetermined value or more in a predetermined time or at predetermined time intervals.

7. The solid oxide fuel cell system according to claim 1, wherein the combustor is a diffusion combustor.

* * * * *